United States Patent
Masuda et al.

(10) Patent No.: US 9,532,240 B2
(45) Date of Patent: Dec. 27, 2016

(54) MOBILE COMMUNICATION SYSTEM, QUALITY CONTROL METHOD, AND MONITORING CONTROL DEVICE

(71) Applicant: FUJITSU LIMITED, Kawasaki-shi, Kanagawa (JP)

(72) Inventors: Yoshio Masuda, Kawasaki (JP); Norio Murakami, Yokohama (JP); Huan Ho, Ho Chi Minh (VN); Mitsuru Nakatsuji, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 205 days.

(21) Appl. No.: 14/202,591

(22) Filed: Mar. 10, 2014

(65) Prior Publication Data

US 2014/0287730 A1  Sep. 25, 2014

(30) Foreign Application Priority Data

Mar. 19, 2013 (JP) .................. 2013-055951

(51) Int. Cl.
| | |
|---|---|
| *H04W 24/02* | (2009.01) |
| *H04W 28/02* | (2009.01) |
| *H04L 29/06* | (2006.01) |
| *H04N 21/258* | (2011.01) |
| *H04N 21/442* | (2011.01) |
| *H04N 21/4425* | (2011.01) |
| *H04N 21/45* | (2011.01) |
| *H04N 21/6543* | (2011.01) |

(Continued)

(52) U.S. Cl.
CPC ............. *H04W 24/02* (2013.01); *H04L 65/80* (2013.01); *H04N 21/25833* (2013.01); *H04N 21/25858* (2013.01); *H04N 21/4424* (2013.01); *H04N 21/4425* (2013.01); *H04N 21/4516* (2013.01); *H04N 21/6543* (2013.01); *H04N 21/6582* (2013.01); *H04L 65/4069* (2013.01); *H04L 65/605* (2013.01); *H04W 4/001* (2013.01)

(58) Field of Classification Search
CPC ..... H04L 65/4069; H04L 65/605; H04L 29/08
USPC ...................................... 455/414.3
See application file for complete search history.

(56) References Cited

U.S. PATENT DOCUMENTS

| | | | |
|---|---|---|---|
| 2009/0204922 A1* | 8/2009 | Bhattacharjee | ......... H04L 67/36 715/771 |
| 2011/0320607 A1* | 12/2011 | Harrang | ............... H04W 4/028 709/226 |

(Continued)

FOREIGN PATENT DOCUMENTS

JP   2003249887 A   9/2003

*Primary Examiner* — Qun Shen
(74) *Attorney, Agent, or Firm* — Myers Wolin, LLC

(57) ABSTRACT

A mobile communication system includes: a content server configured to accumulate a content; a wireless base station device configured to receive the content sent from the content server; a terminal device configured to receive the content wirelessly sent from the wireless base station device; and a monitoring control device configured to: control delivery of the content to the terminal device over the content server, and send to the terminal device, when a quality of experience (QoE) for a user utilizing the terminal device due to delivery of the content, the QoE being predicted in accordance with sending of a first delivery request for the content from the terminal device, does not meet a given condition, information on a clock time or a place in which a new predicted QoE meets the given condition.

17 Claims, 47 Drawing Sheets

(51) Int. Cl.
*H04N 21/658* (2011.01)
*H04W 4/00* (2009.01)

(56) References Cited

U.S. PATENT DOCUMENTS

2013/0263167 A1* 10/2013 Parthasarathy ..... H04L 41/5067
725/14
2014/0282777 A1* 9/2014 Gonder ................ H04L 65/605
725/109

* cited by examiner

FIG. 9

| TRAFFIC VOLUME [ATTEMPT/MIN] | AMOUNT OF DELAY TIME [SECOND] | | |
|---|---|---|---|
| | LARGE ($60 < T$) | MEDIUM ($5 < T \leq 60$) | SMAL ($T \leq 5$) |
| LARGE ($1{,}000 \leq A$) | QoE(1) | QoE(2) | QoE(3) |
| MEDIUM ($100 \leq A < 1{,}000$) | QoE(1) | QoE(2) | QoE(3) |
| SMALL ($A < 100$) | OTHERS | OTHERS | QoE(3) |

FIG. 10

| CLOCK TIME INFORMATION | PLACE | | | |
|---|---|---|---|---|
| | AREA 1 (LATITUDE AND LONGITUDE) 1 | AREA 2 (LATITUDE AND LONGITUDE) 2 | AREA 3 (LATITUDE AND LONGITUDE) 3 | ... |
| . | - | - | - | - |
| . | - | - | - | - |
| . | - | - | - | - |
| 08:00 | QoE(1) | QoE(1) | QoE(2) | ... |
| 08:01 | QoE(1) | QoE(1) | QoE(2) | ... |
| 08:02 | QoE(1) | QoE(1) | QoE(2) | ... |
| 08:03 | QoE(1) | QoE(2) | QoE(3) | ... |
| 08:04 | QoE(1) | QoE(2) | QoE(3) | ... |
| 08:05 | QoE(1) | QoE(2) | QoE(3) | ... |
| 08:06 | QoE(1) | QoE(3) | QoE(3) | ... |
| 08:07 | QoE(2) | QoE(3) | QoE(3) | ... |
| 08:08 | QoE(3) | QoE(3) | QoE(3) | ... |
| 08:09 | QoE(3) | QoE(3) | QoE(3) | ... |
| . | - | - | - | - |
| . | - | - | - | - |
| . | - | - | - | - |

305

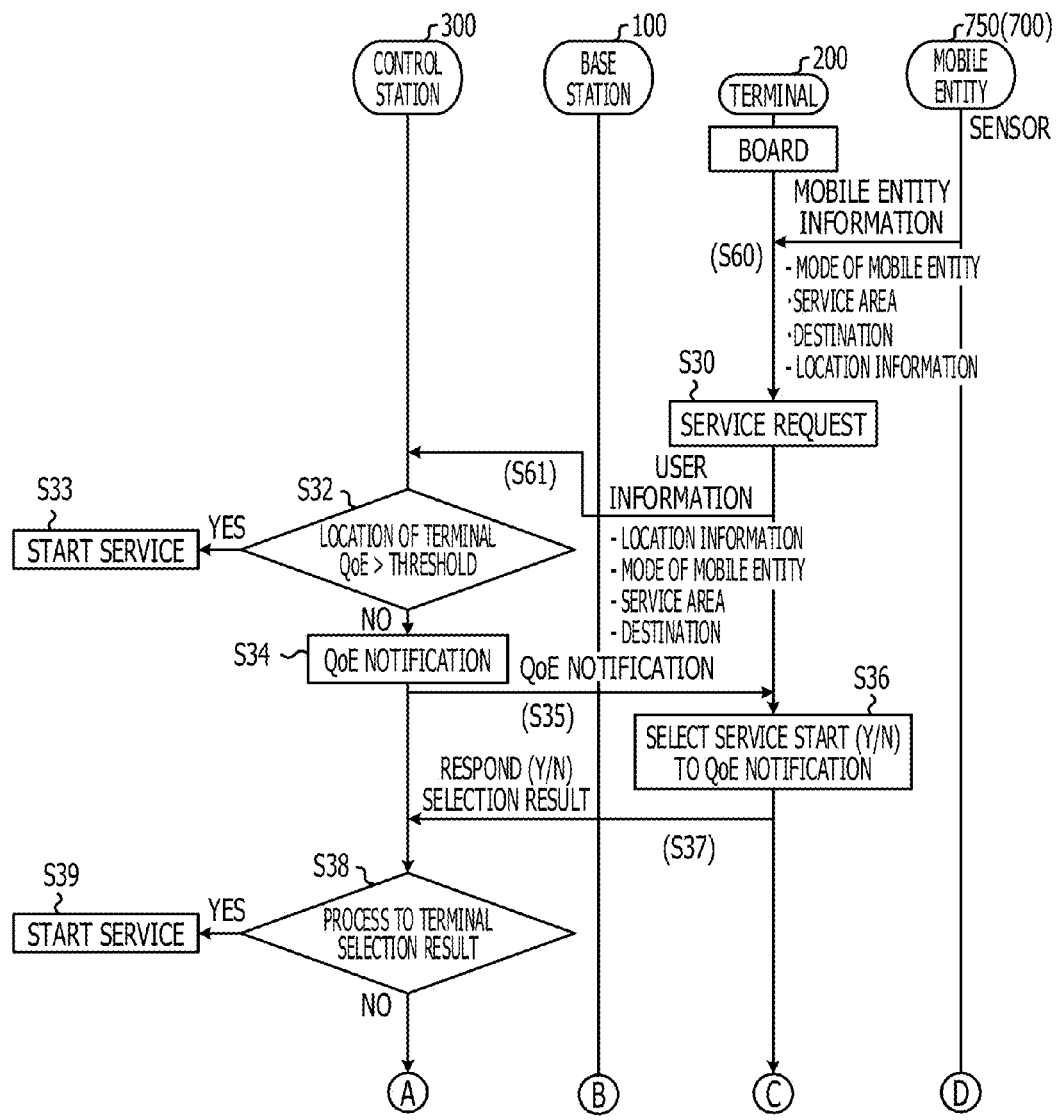

FIG. 20

| AREA ATTRIBUTE 1<br>(AREA CATEGORY INFORMATION OF MAP:<br>MOST UPDATED VERSION) | DENSE URBAN | URBAN | SUB-URBAN | RURAL |
|---|---|---|---|---|
| CORRESPONDING QoE 1 | 1 | 2 | 3 | 3 |
| AREA ATTRIBUTE 2<br>(PRESENCE OF STATION IN AREA) | EXISTING | EXISTING | EXISTING | EXISTING |
| | NO | NO | NO | NO |
| CORRESPONDING QoE2 (STATION EXISTING) | 1 | 1 | 2 | 2 |
| CORRESPONDING QoE2 (NO STATION) | 1 | 2 | 3 | 3 |

FIG. 21

| INITIAL QoE DECISION FACTOR | PLACE | | | | | | | |
|---|---|---|---|---|---|---|---|---|
| | AREA 1 (LATITUDE AND LONGITUDE) 1 | AREA 2 (LATITUDE AND LONGITUDE) 2 | AREA 3 (LATITUDE AND LONGITUDE) 3 | AREA 4 (LATITUDE AND LONGITUDE) 4 | AREA 5 (LATITUDE AND LONGITUDE) 5 | AREA 6 (LATITUDE AND LONGITUDE) 6 | AREA 7 (LATITUDE AND LONGITUDE) 7 | AREA 8 (LATITUDE AND LONGITUDE) 8 |
| AREA CATEGORY | DENSE URBAN | DENSE URBAN | URBAN | URBAN | SUB-URBAN | SUB-URBAN | RURAL | RURAL |
| STATION (PRESENCE) | EXISTING | NO | EXISTING | NO | EXISTING | NO | EXISTING | NO |
| ASSUMED QoE1 | 1 | 1 | 2 | 2 | 3 | 3 | 3 | 3 |
| ASSUMED QoE2 | 1 | 1 | 1 | 2 | 2 | 3 | 2 | 3 |
| ASSUMED QoE | 1 | 1 | 1 | 2 | 2 | 3 | 2 | 3 |

FIG. 38

| CONTENT | USER EXPERIENCE QUALITY | | |
|---|---|---|---|
| | 1. GOOD | 2. STANDARD | 3. DEGRADED |
| VIDEO | DIRECTLY VIDEO | SUBTITLED VIDEO WITHOUT SOUND | COMIC |
| HIGH RESOLUTION IMAGE | ORIGINAL SIZE | MEDIUM SIZE | SMALL SIZE |
| | | | |

FIG. 42

| CONTENT | USER EXPERIENCE QUALITY | | |
|---|---|---|---|
| | 1. GOOD | 2. STANDARD | 3. DEGRADED |
| TRANSMISSION RATE | 2Mbps | 800kbps | 100kbps |
| (NUMBER OF FRAMES) | 720p(HD) | 480p | 100p |

MOBILE COMMUNICATION SYSTEM, QUALITY CONTROL METHOD, AND MONITORING CONTROL DEVICE

CROSS-REFERENCE TO RELATED APPLICATION

This application is based upon and claims the benefit of priority of the prior Japanese Patent Application No. 2013-055951, filed on Mar. 19, 2013, the entire contents of which are incorporated herein by reference.

FIELD

The embodiments discussed herein are related to a mobile communication system, a quality control method, and a control device.

BACKGROUND

Recently, mobile communication systems, such as mobile telephone systems and wireless local area networks (LAN), are widely utilized. In the field of mobile communication, to further improve the communication speed and the communication capacity, communication technology in the next generation is being discussed continuously. For example, in the 3rd generation partnership project (3GPP) which is a standards body, standardization of communication standards, such as long term evolution (LTE) and LTE-Advances (LTE-A) on the basis of the LTE, is completed or under review.

SUMMARY

According to an aspect of the invention, a mobile communication system includes: a content server configured to accumulate a content; a wireless base station device configured to receive the content sent from the content server; a terminal device configured to receive the content wirelessly sent from the wireless base station device; and a monitoring control device configured to: control delivery of the content to the terminal device over the content server, and send to the terminal device, when a quality of experience (QoE) for a user utilizing the terminal device due to delivery of the content, the QoE being predicted in accordance with sending of a first delivery request for the content from the terminal device, does not meet a given condition, information on a clock time or a place in which a new predicted QoE meets the given condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 illustrates an example of QoE decision rules;

FIG. 10 illustrates an example of a knowledge DB;

FIGS. 16A and 16B illustrate a sequence diagram of another behavior example;

FIG. 20 illustrates an example of decision rules in the initial DB process;

FIG. 21 illustrates an example of accumulating initial experience quality after the initial DB process;

FIG. 38 illustrates an example of a table illustrating relationship between a type of content and a QoE;

FIG. 42 illustrates an example of a table illustrating relationship between a transmission rate and a QoE;

DESCRIPTION OF EMBODIMENTS

Figure 1:
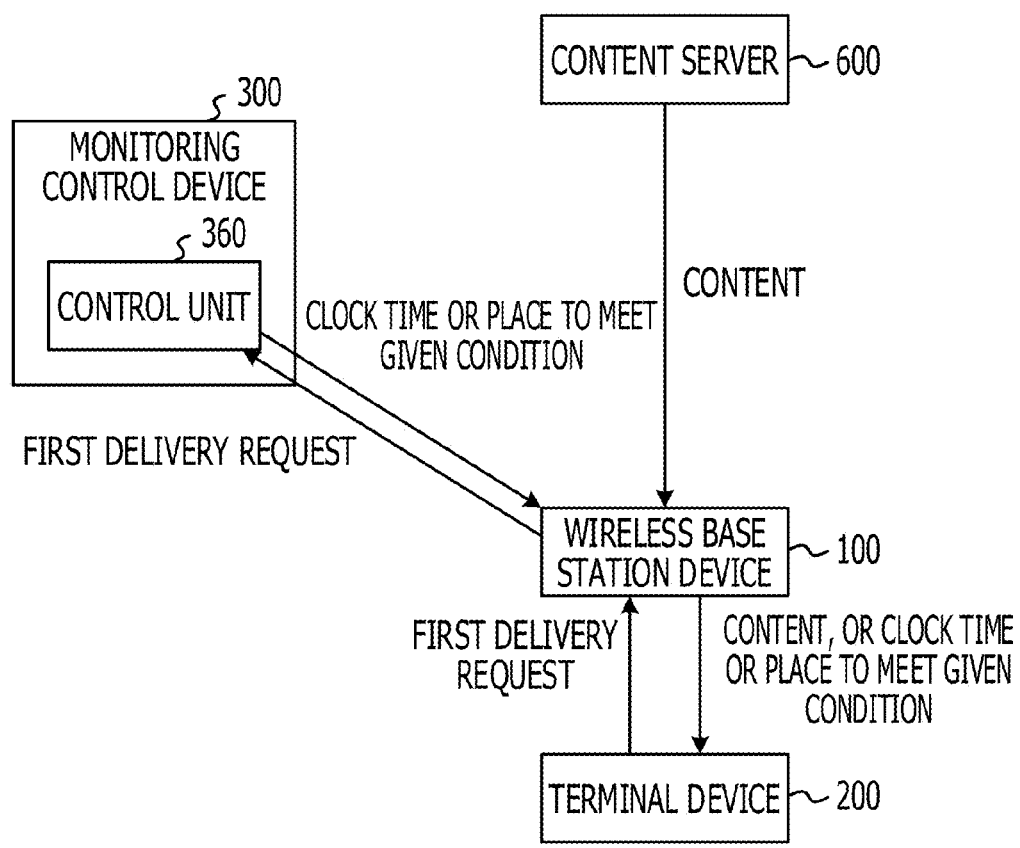
FIG. 1 illustrates a configuration example of a mobile communication system.

Descriptions are given below to embodiments of the present disclosure.

While inventing the present embodiments, observations were made regarding a related art. Such observations include the following, for example.

In mobile communication systems of the related art, when using a portable mobile terminal, such as a feature phone and a smartphone, there may be a case that a user is not provided a desired service in real time depending on the wireless environment in a travel destination, such as in a building, in a subway, or in a crowded city. In addition, the traffic in the radio section rapidly increases due to the spread of smartphones and the wireless communication environment is prone to increasingly deteriorate.

To deal with such a situation, mobile communication carriers attempt to improve the wireless communication quality by, for example, additionally installing infrastructure, offloading the traffic, introducing a new broadband communication system including the standardization technique described above, and the like.

For example, the communication data volume is suppressed or increased by the quality of service (QoS) and the like to improve the service quality, and a base station is newly located in a zone with a large traffic volume to share the load, thereby attempting improvement of the radio quality.

However, there may also be a case of producing a service delay in a period of time when the traffic is concentrated, such as a commuting time period or opening of an event, and thus the current situation in the field of mobile communication system is not regarded as providing a service to satisfy all users.

Among such mobile communication systems, there is, for example, a technique described as follows. That is, quality data on data communication quality in accordance with a receiving condition when a mobile telephone, which is a receiving device, actually receives data from a base station is accumulated by generating history information associated with reception regions classified in given ranges, and the quality data of the history information is displayed respectively by being divided into each of the plurality of reception regions on a map displayed on a given display unit (Japanese Laid-open Patent Publication No. 2003-249887). It is considered that this technique enables to recognize, for example, the data communication quality for each of the plurality of reception regions to a user.

In techniques of the related art, a timing to notify a user of data communication quality for each reception regions and contents to be notified of are not optimized. For example, in the technique of Japanese Laid-open Patent Publication No. 2003-249887, in a case that a button operation in order to shift into a data communication quality guide mode is carried out by a user, the quality data for each reception region is displayed on a map displayed on the mobile telephone. Therefore, in the mobile telephone of Japanese Laid-open Patent Publication No. 2003-249887, the user is not notified of the data communication quality for each reception region until recognizing that the button operation in order to shift into a data communication quality guide mode is carried out by the user, and there is a problem of causing frustration to the user due to the degradation of communication quality. Although the frustration due to the degradation of communication quality may motivate the user for the button operation, it only allows subsequent confirmation and an economic burden, a power consumption burden, and the like occur due to the data communication to become in vain as a result.

Accordingly, it is an object in one aspect of the embodiment to provide a mobile communication system, a quality control method, and a control device to avoid in advance or remove frustration of a user. It is another object in one aspect of the embodiment to provide a mobile communication system, a quality control method, and a control device to deliver the quality information in advance of the call without requiring user intervention.

First Embodiment

FIG. 1 illustrates a configuration example of a mobile communication system 10. The mobile communication system 10 is provided with a wireless base station device 100, a terminal device 200, a monitoring control device 300, and a content server 600.

The wireless base station device 100 receives a content sent from the content server 600. And, the wireless base station device 100 sends the content to the terminal device 200. The content is, for example, music, a video, a game, or the like created with video data, audio data, text data, or the like, and the content includes video data, audio data, text data, or the like. The wireless base station device 100 carries out wireless communication with the terminal device 200 and sends the content to the terminal device 200 by, for example, converting the content to a wireless signal.

The wireless base station device 100 also receives a first delivery request sent from the terminal device 200 and sends the first delivery request thus received to the monitoring control device 300. In this case as well, the wireless base station device 100 receives a wireless signal sent from the terminal device 200, for example, and converts the wireless signal thus received to the first delivery request.

The terminal device 200 receives the content sent from the wireless base station device 100, for example. The terminal device 200 is provided with, for example, a monitor screen and a speaker to display a video or texts included in the content on the monitor screen and to output a sound included in the content from the speaker. The user is able to listen to and watch the content delivered from the content server 600 via the terminal device 200.

The terminal device 200 also sends a first delivery request for a content. For example, the terminal device 200 sends a content request message that requests content delivery as the first delivery request to the wireless base station device 100. The first delivery request may include, for example, location information of the terminal device 200, distinguishing information to distinguish a content requested by the terminal device 200 (or a user utilizing the terminal device 200) from another content, and the like.

The monitoring control device 300 controls content delivery to the terminal device 200 over the content server 600. The monitoring control device 300 is provided with a control unit 360.

When a quality of experience (QoE) for a user utilizing the terminal device 200 fails to meet a given standard, the control unit 360 sends control information to the terminal device 200. The QoE indicates user experience quality experienced by a user utilizing the terminal device 200 by content delivery. The QoE is predicted (estimated) in accordance with sending of the first delivery request for content from the terminal device 200. The given standard is an example of a given condition. The control information may include, for example, information on a clock time or a place in which another QoE (that is, a new QoE) meets the given standard.

The content server 600 accumulates the content and sends the content to the wireless base station device 100 by control of, for example, the control unit 360.

In the present first embodiment, when the predicted user experience quality does not meet the given standard, the monitoring control device 300 sends information on a clock time or a place in which user experience quality meets the given standard to the terminal device 200. Accordingly, the terminal device 200 receives content delivery in the received clock time or place, thereby enabling, for example, to predict that the user experience quality meets the given standard, for the user to receive service provision without a response delay, and also to avoid in advance or remove the frustration because there is no response delay.

Second Embodiment

Next, a second embodiment is described. The descriptions are given to the second embodiment in the following order:
<1. Mobile communication system>;
<2. Configuration example of monitoring control device>;
<3. Configuration example of base station and terminal>; and
<4. Behavior example>.
<1. Mobile Communication System>

Figure 2:
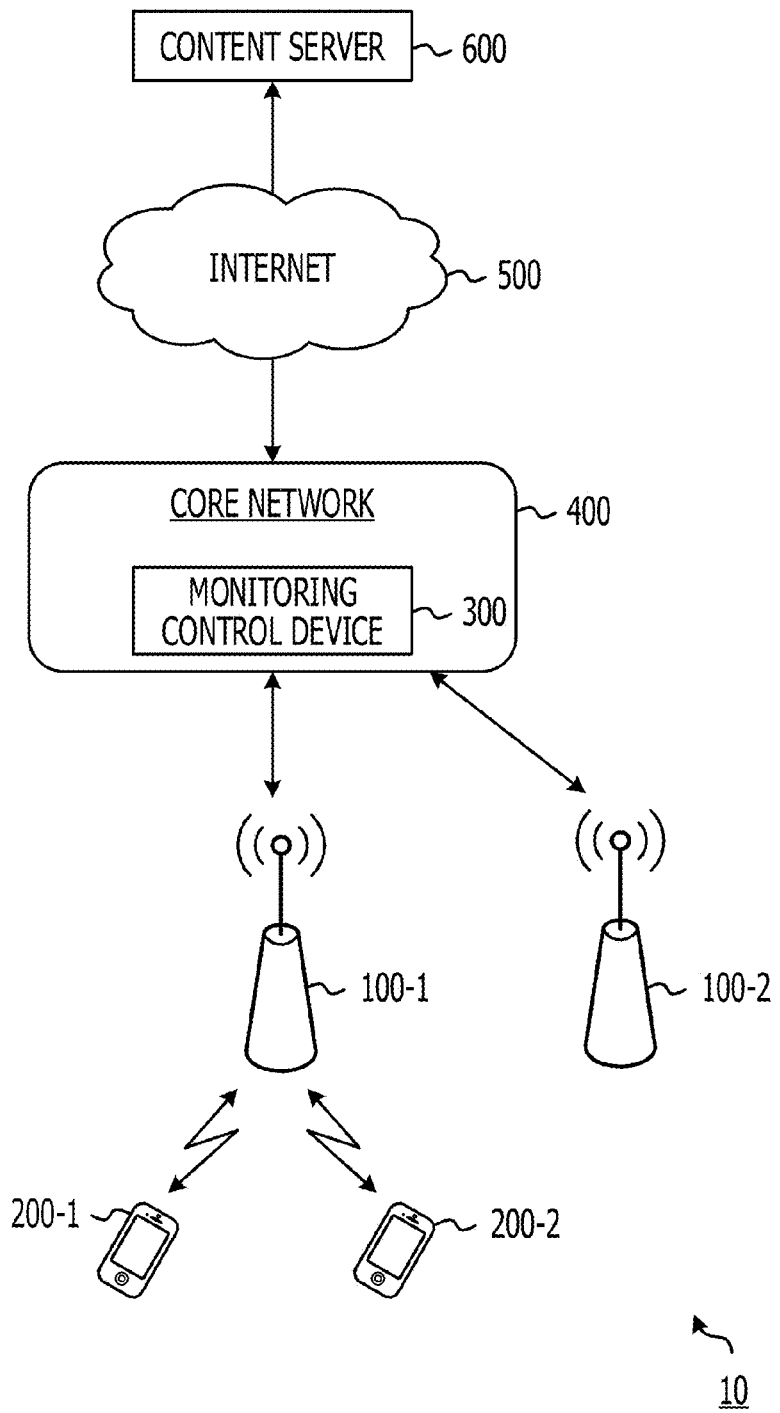
FIG. 2 illustrates another configuration example of a mobile communication system.

Descriptions are given to a configuration example of a mobile communication system with reference to FIG. 2. The mobile communication system 10 is provided with wireless base station devices (hereinafter, may be referred to as "base stations") 100-1 and 100-2, terminal devices (hereinafter, may be referred to as "terminals") 200-1 and 200-2, a core network 400, the internet 500, and the content server 600. The core network 400 is provided with the monitoring control device 300.

Each of the base stations 100-1 and 100-2 is a wireless communication device to carry out wireless communication by wirelessly connecting with the terminals 200-1 and 200-2. The base stations 100-1 and 100-2 are capable of providing a variety of services, such as audio communication and video delivery, to the terminals 200-1 and 200-2 in one or a plurality of cell ranges (or service coverage or communicable ranges).

Each of the terminals 200-1 and 200-2 is a wireless communication device to carry out wireless communication by wirelessly connecting with the base stations 100-1 and 100-2. The terminals 200-1 and 200-2 are, for example, a feature phone, a smartphone, a personal computer, or the like.

The monitoring control device 300 is connected with one or a plurality of the base stations 100-1 and 100-2, and also connected with the content server 600 via the internet 500. The monitoring control device 300 controls delivery of a service content to the terminals 200 over the content server 600.

The monitoring control device 300 predicts user experience quality (quality of experience: hereinafter, may be referred to as "QoE") in a case that a user utilizing the terminal 200-1 or 200-2 (hereinafter, the terminal 200-1 or 200-2 may also be referred to as "a user") utilizes the service content.

The QoE is an index value representing a degree of frustration that a user feels in a case that, for example, a service content is utilized and a response thereof is delayed. Alternatively, the QoE is, for example, quality experienced by a user utilizing a service content for the content. For example, the QoE becomes a good value when the response delay is less and the QoE may become not a good value when the response delay is more.

Further, the monitoring control device 300 predicts a clock time at which the QoE becomes good when, for example, the predicted QoE is degraded. In this case, the monitoring control device 300 is also capable of controlling the content server 600 to deliver a service content from the clock time. Details of the monitoring control device 300, a method of QoE calculation, and the like are described later.

The content server 600 accumulates various types of service content, such as video data and audio data, for example, to deliver the accumulated service content in accordance with a message from the monitoring control device 300 and the like.

In the mobile communication system 10 illustrated in FIG. 2, an example is illustrated in which two base stations 100-1 and 100-2 are connected with the core network 400 (or the monitoring control device 300). In the mobile communication system 10, one base station 100-1 may also be connected with the core network 400 and three or more base stations may also be connected.

In the mobile communication system 10 illustrated in FIG. 2, an example is represented in which two terminals 200-1 and 200-2 are connected with the base station 100-1. In the mobile communication system 10, one terminal 200-1 may also be connected with the base station 100-1 and three or more terminals may also be connected with the base station 100-1. The connection destination of the terminals 200-1 and 200-2 may also be the base station 100-2.

In the following descriptions, unless otherwise specified, the base stations 100-1 and 100-2 may be referred to as a base station 100 and the terminals 200-1 and 200-2 as a terminal 200, respectively.

<2. Configuration Example of Monitoring Control Device>

Figure 3:
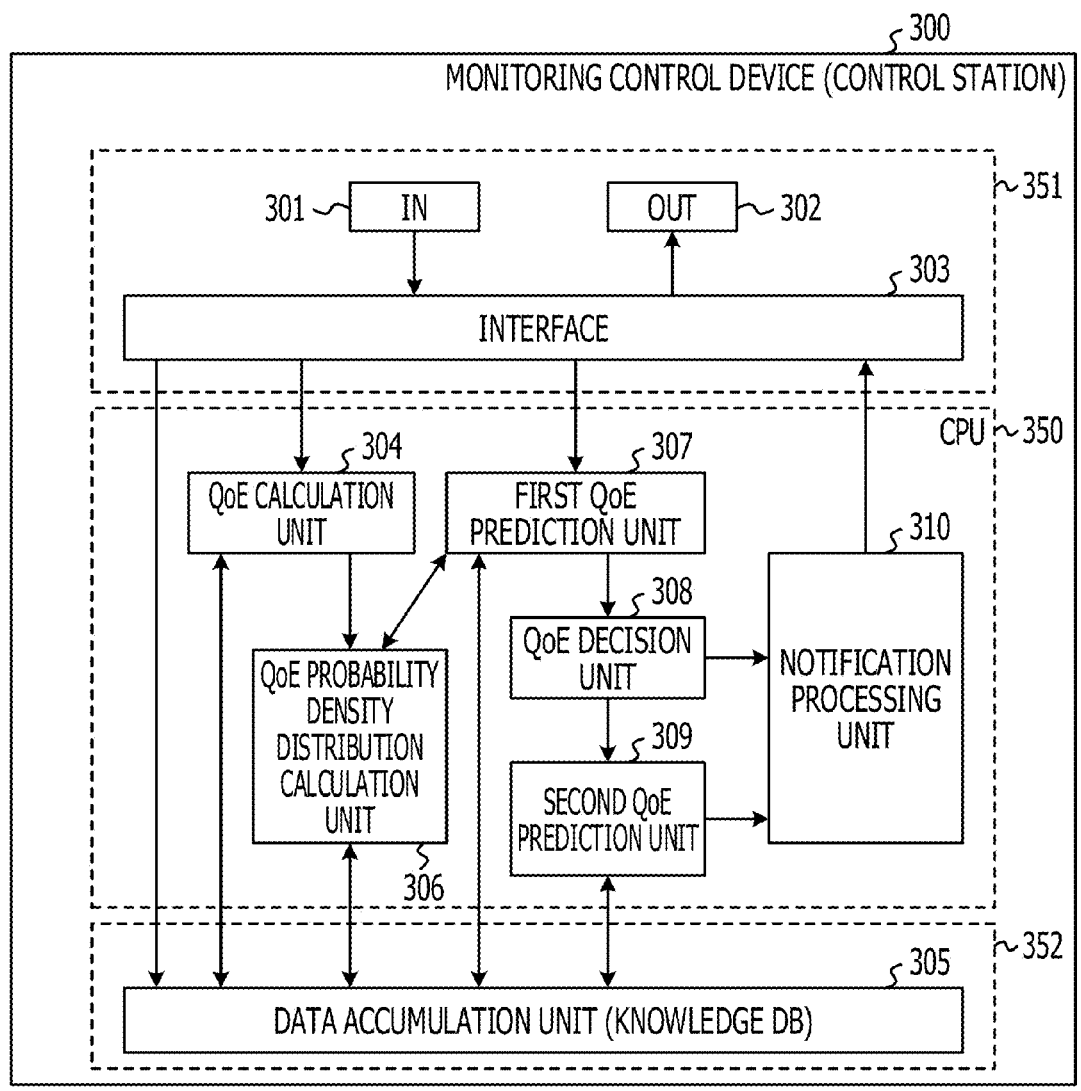
FIG. 3 illustrates a configuration example of a monitoring control device.

FIG. 3 illustrates a configuration example of the monitoring control device 300. The monitoring control device 300 is provided with an input unit (IN) 301, an output unit (OUT) 302, an interface 303, a QoE calculation unit 304, a data accumulation unit 305, a QoE probability density distribution calculation unit 306, a first QoE prediction unit 307, a QoE decision unit 308, a second QoE prediction unit 309, and a notification processing unit 310.

As receiving a message sent from the base station 100 or the content server 600 or the like, the input unit 301 outputs the message or the like to the interface 303. The output unit 302 sends the message or the like received from the interface 303 to the base station 100 or the content server 600.

The interface 303 extracts data or the like from the message or the like received by the input unit 301 to output the data or the like to the data accumulation unit 305 or the QoE calculation unit 304. The interface 303 also converts the process result or the like received from the notification processing unit 310 to a format possible to be sent to the base station 100 or the content server 600 to output the process result to the output unit 302.

The QoE calculation unit 304 calculates a QoE when a user utilizes a service content. For example, the QoE calculation unit 304 calculates the QoE based on a time period until delivery of a service content is started after the terminal 200 requests the service content (or an amount of delay time) and a traffic volume at that time. The QoE calculation may also be calculated by, for example, user throughput and a traffic volume, each combination of user throughput and a traffic volume, and further combination with other indexes, such as buffer utilization and a packet loss rate, other than the amount of delay time and the traffic volume. Details of the QoE calculation are described later. The QoE calculation unit 304 accumulates the QoE thus calculated in the data accumulation unit 305 to output the calculated QoE to the QoE probability density distribution calculation unit 306.

The data accumulation unit 305 accumulates location information of the terminal 200 utilized for the QoE calculation, temporal information, a traffic volume, and the calculation result of the calculated QoE. The data accumulation unit 305 includes a knowledge DB to accumulate the location information, the temporal information, the traffic volume, and the like, and in the following descriptions, the data accumulation unit 305 may be referred to as a knowledge DB 305. Details of the knowledge DB 305 are described later while an example thereof is illustrated in FIG. 10, for example.

The QoE probability density distribution calculation unit 306 calculates QoE, for example, for each given time interval in each partitioned area. For example, the areas are defined that one area is a square range of a set value, and in a case that the set value for one side is "250 m", one area becomes a 250 m square. For example, the QoE calculation unit 304 calculates QoE at a certain location at a certain moment whereas the QoE probability density distribution calculation unit 306 calculates, based on one or a plurality of QoEs in given groups, QoE probability density distribution, that is an example of a statistical amount, in each group to calculate a representative value of the QoEs in each group. Here, the one group is defined as a collection of data that applies to a combination range of, for example, "area" and "clock time information (or set time interval)" among the accumulated data. Details of the QoE calculation and the like are described later. The QoE probability density distribution calculation unit 306 accumulates the probability density distribution and the representative value of the QoEs thus calculated in the knowledge DB 305 to output the probability density distribution and the representative value to the first QoE prediction unit 307.

The first QoE prediction unit 307, when the terminal 200 requests utilization of a service content, for example, predicts a QoE assumed at a requested location and at a requested clock time based on the probability density distribution information. Details thereof are described later. The first QoE prediction unit 307 outputs the predicted QoE to the QoE decision unit 308.

The QoE decision unit 308 receives the predicted QoE from, for example, the first QoE prediction unit 307 to decide whether or not the QoE is degraded. For example, the QoE decision unit 308 compares the QoE with a decision threshold to decide that the QoE is degraded when the QoE is less than the decision threshold and to decide that the QoE is good otherwise.

The QoE decision unit 308 directs, as deciding that the QoE is degraded, the second QoE prediction unit 309 to estimate a clock time at which the QoE becomes good. In contrast, the QoE decision unit 308 directs, as deciding that the QoE is good, the notification processing unit 310 to start a service to the content server 600.

The second QoE prediction unit 309 calculates the clock time at which the QoE becomes good in accordance with the direction from the QoE decision unit 308 based on the probability density distribution information calculated by the first QoE prediction unit 307. Details of the calculation method are described later. The second QoE prediction unit 309 directs the notification processing unit 310 to send the prediction clock time thus calculated to the terminal 200 that has requested utilization of the service content.

The notification processing unit 310 generates a message that requests to carry out delivery of the service content to the content server 600 in accordance with, for example, the direction from the QoE decision unit 308. The notification processing unit 310 also generates a message to send the prediction clock time to the terminal 200 in accordance with, for example, the direction from the second QoE prediction unit 309. The notification processing unit 310 outputs the message thus generated to the interface 303.

The QoE calculation unit 304, the QoE probability density distribution calculation unit 306, the first QoE prediction unit 307, the QoE decision unit 308, the second QoE prediction unit 309, and the notification processing unit 310 may also be achieved by hardware, such as a central processing unit (CPU, or a control unit) 350, for example. In this case, the input unit 301, the output unit 302, and the interface 303 may be achieved by hardware, such as an interface 351, for example. The data accumulation unit 305 may be achieved by a memory 352, for example.

The CPU 350 corresponds to, for example, the control unit 360 in the first embodiment.

The monitoring control device 300 may be referred to as a control station 300 in the following descriptions.

<3. Configuration Example of Base Station and Terminal>

Figure 4:
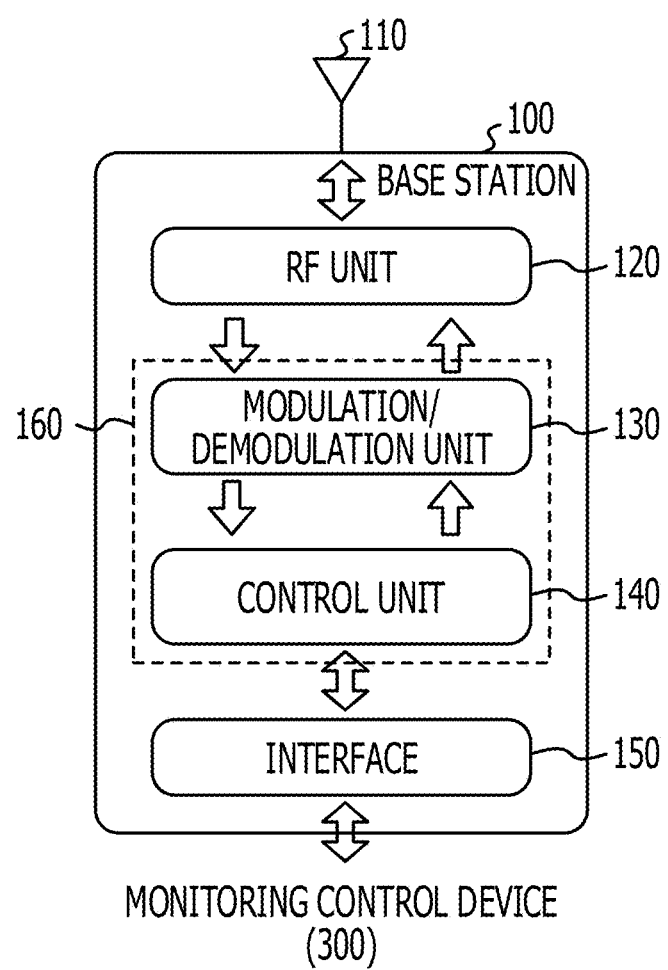
FIG. 4 illustrates a configuration example of a base station.
Figure 5:
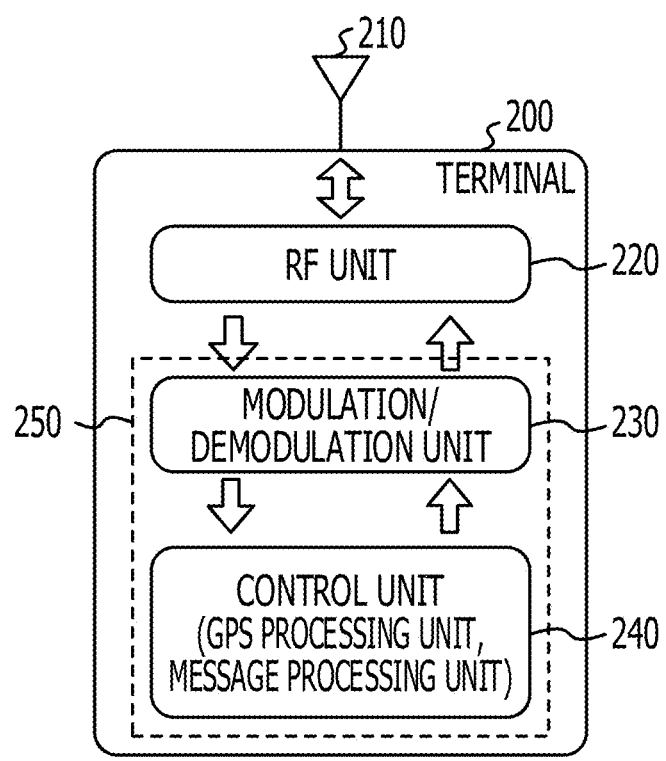
FIG. 5 illustrates a configuration example of a terminal.

Next, each configuration example of the base station 100 and the terminal 200 is described. FIG. 4 and FIG. 5 illustrate the respective configuration examples of the base station 100 and the terminal 200.

The base station 100 is provided with an antenna 110, a radio frequency (RF) unit 120, a modulation/demodulation unit 130, a control unit 140, and an interface 150. The antenna 110 sends a wireless signal outputted from the RF unit 120 to the terminal 200, and receives a wireless signal sent from the terminal 200 to output the received wireless signal to the RF unit 120.

The RF unit 120 converts (down-converts) a wireless signal in the radio band to a signal in the baseband to output the signal after the conversion to the modulation/demodulation unit 130. The RF unit 120 also converts (up-converts) a signal outputted from the modulation/demodulation unit 130 to a wireless signal in the radio band to output the wireless signal after the conversion to the antenna 110.

The modulation/demodulation unit 130 extracts data, such as user data and a message, by applying demodulation process, error correction decoding process, or the like to the signal outputted from the RF unit 120 to output the data to the control unit 140. The modulation/demodulation unit 130 also applies error correction coding process, modulation process, or the like to the data outputted from the control unit 140 to output the data to the RF unit 120 as a signal. The modulation/demodulation unit 130 may also be provided with, for example, a modulation circuit, an error correction coding circuit, and the like to carry out such modulation process, error correction coding process, and the like.

The control unit 140 controls the entire base station 100, outputs the data or the like outputted from, for example, the modulation/demodulation unit 130 to the interface 150, and outputs the data outputted from the interface 150 to the modulation/demodulation unit 130.

The interface 150 converts the data or the like outputted from the control unit 140 to a format possible to be sent to the monitoring control device 300 to send the data to the monitoring control device 300. The interface 150 also converts, as receiving the data or the like sent from the monitoring control device 300, to a format possible to be processed inside the base station 100 to output the data to the control unit 140.

The base station 100 may also be configured as hardware with, for example, a CPU 160 and the RF unit 120. In this case, for example, the CPU 160 includes the modulation/demodulation unit 130 and the control unit 140.

The terminal 200 is provided with an antenna 210, an RF unit 220, a modulation/demodulation unit 230, and a control unit 240.

The antenna 210 receives a wireless signal sent from the base station 100 to output the wireless signal to the RF unit 220, and sends a wireless signal outputted from the RF unit 220 to the base station 100.

The RF unit 220 converts (or down-converts), as receiving a wireless signal from the antenna 210, the wireless signal in the radio band to a signal in the baseband to output the signal after the conversion to the modulation/demodulation unit 230. The RF unit 220 also converts (or up-converts) a signal outputted from the modulation/demodulation unit 230 to a wireless signal in the radio band. The RF unit 220 may also be provided with, for example, an analogue to digital (AD) conversion circuit, a frequency conversion circuit, and the like to carry out such conversion process.

The modulation/demodulation unit 230 extracts data, such as user data and a message, by applying demodulation process, error correction decoding process, or the like to the signal outputted from the RF unit 220 to output the data to the control unit 240. The modulation/demodulation unit 230 also applies error correction coding process, modulation process, or the like to the data outputted from the control unit 240 to output the data to the RF unit 220 as a signal. The modulation/demodulation unit 230 may also be provided with, for example, a modulation circuit, an error correction coding circuit, and the like to carry out such modulation process, error correction coding process, and the like.

The control unit 240 measures, for example, a location of the terminal 200 utilizing the global positioning system (GPS) or the like and generates location information indicating a current location of the terminal 200. The control unit 240 also displays various types of message or the like received from the modulation/demodulation unit 230, for example, on a display unit (or a monitor, not illustrated). Further, the control unit 240 generates various types of message corresponding to, for example, an operation of a user to the terminal 200. For example, such operation is carried out by a key operation and the like on a liquid crystal screen displayed on the display unit. Given such a situation, the control unit 240 has functions of, for example, a GPS processing unit, a message processing unit, and the like. The control unit 240 outputs the data, such as a message, thus generated to the modulation/demodulation unit 230.

The terminal 200 may also be configured as hardware with, for example, a CPU 250 and the RF unit 220. In this case, for example, the CPU 250 includes the modulation/demodulation unit 230 and the control unit 240.

<4. Behavior Example>

Next, a behavior example of the mobile communication system 10 is described. The descriptions are given to the behavior example in the following order:

<4.1 Collection process of user data and accumulation process in knowledge DB>;
<4.2 QoE calculation process>;
<4.3 Basic behavior process>;
<4.4 Behavior example in case of given travel route>;
<4.5 Behavior example in case of unidentified travel route>;
<4.6 Registration of initial value in knowledge DB>;
<4.7 Flow of each process>;
<4.8 Prediction and improvement of QoE>;
<4.9 Service content modification process>; and
<4.10 Control example>.

As the entire behaviors in the mobile communication system 10, 1) a QoE is calculated in the monitoring control device 300, 2) a QoE for each time period in each area is calculated from QoE probability density distribution to be accumulated in a knowledge DB. Then, 3) the monitoring control device 300 predicts a QoE from the knowledge DB 305. Such flow of the entire behaviors is described in the above <4.1> through <4.3>.

Next, descriptions are given to specific behavior examples in respective cases that a travel route of the terminal 200 is given and unidentified (above <4.4> and <4.5>).

Lastly, descriptions are given to registration of an initial value in the knowledge DB 305 (above <4.6>), a summary of each process (above <4.7>), prediction and improvement of a QoE (above <4.8>), modification process of a service content (above <4.9>), the entire summary (above <4.10>), and the like.

<4.1 Collection Process of User Data and Accumulation Process in Knowledge DB>

The monitoring control device 300 collects user data, before calculating a QoE, to accumulate the user data in the knowledge DB 305. The monitoring control device 300 calculates a QoE based on the user data thus collected. In this <4.1>, descriptions are given to collection process of user data and accumulation process in the knowledge DB 305.

Figure 6:
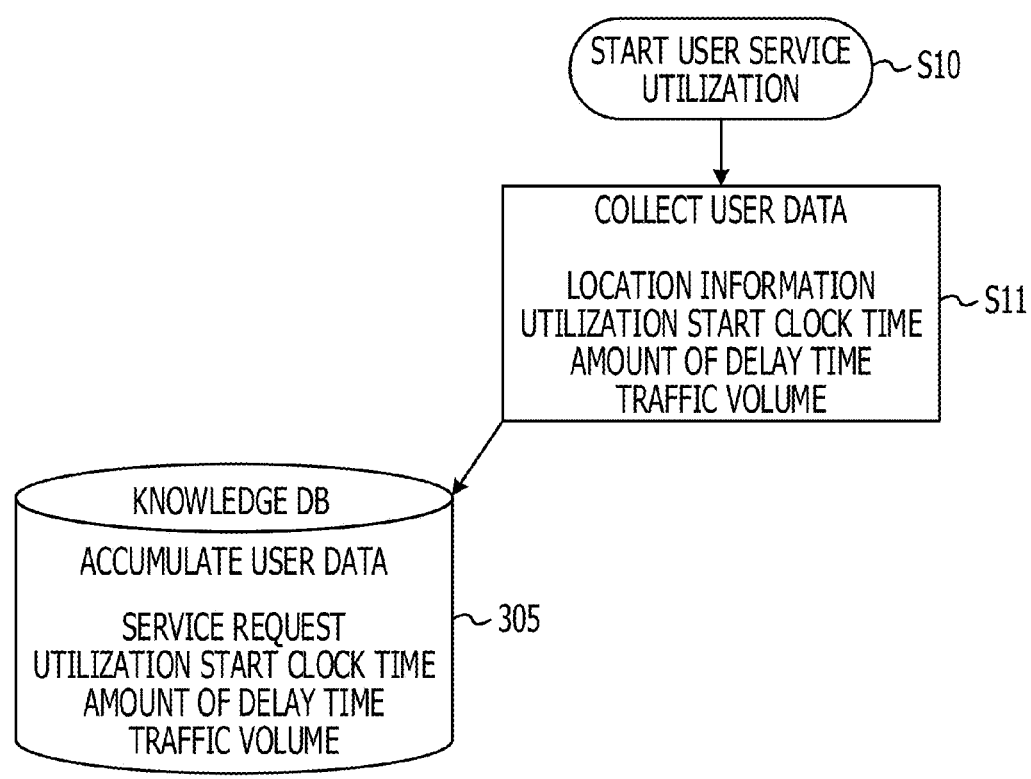
FIG. 6 illustrates an example of process to collect user data.

FIG. 6 is a flowchart illustrating an example of collection process of user data and accumulation process in the knowledge DB 305.

As the terminal 200 starts utilization of a user service (S10), the monitoring control device 300 collects user data (S11). The user data may include, for example, location information of the terminal 200, a utilization start clock time, a delay time, a traffic volume, and the like.

Figure 7:
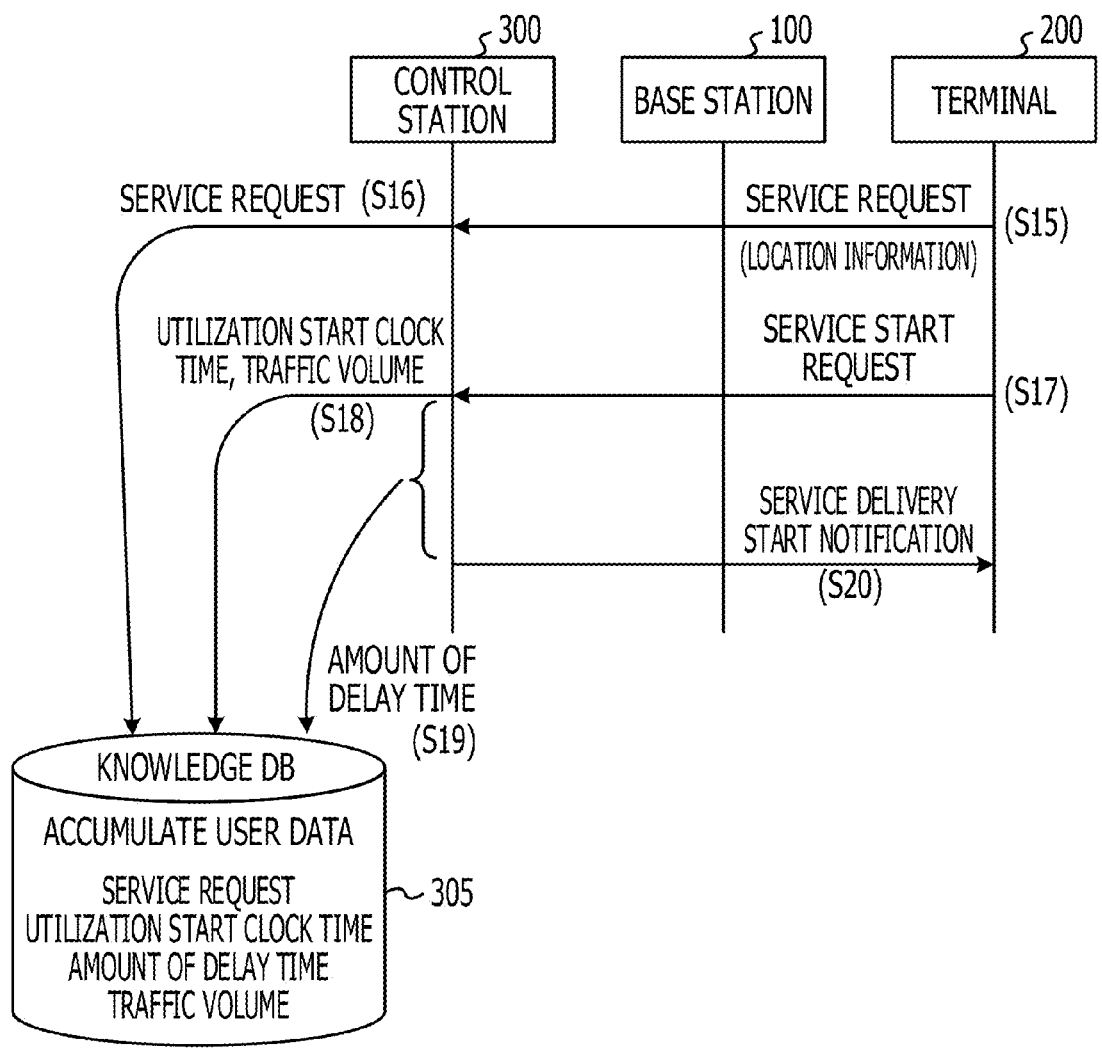
FIG. 7 illustrates another example of process to collect user data.

FIG. 7 illustrates an example of how the location information, the utilization start clock time, and the amount of delay time are accumulated in the knowledge DB 305. For example, as starting utilization of a user service, the terminal 200 sends a service request message (or a content delivery request) that requests a content service (S15). In this case, the terminal 200 obtains location information indicating a current location by the GPS or the like to send the current location including in the service request message.

As receiving the service request message via the base station 100, the monitoring control device (depicted as a control station in FIG. 7) 300 extracts the location information included in the message to accumulate the location information in the knowledge DB 305 (S16). For example, the interface 303 (for example, FIG. 3) carries out the extraction of the location information and the accumulation in the knowledge DB 305.

Subsequently, in a case of actually requesting start of a service by a user operation and the like, the terminal 200 sends a service start request message (S17).

As receiving the service start request message, the monitoring control device 300 accumulates, for example, a clock time of receiving the message in the knowledge DB 305 (S18). As receiving the service start request message, the monitoring control device 300 also increments a number of times receiving the message accumulated in the knowledge DB 305. A count value after the increment becomes, for example, the traffic volume. For example, the interface 303 measures the receiving clock time, counts the number of times receiving the message, and accumulates the receiving clock time thus measured and the count value in the knowledge DB 305.

Subsequently, the monitoring control device 300 sends a service delivery start notification message to the terminal 200 prior to content delivery (S20). At this time, the monitoring control device 300 measures a time period until the service delivery start notification message is sent after receiving the service start request message (or a time when delivery of a content service is actually started) as the amount of delay time and accumulates the time period in the knowledge DB 305. For example, the amount of delay time until the service delivery start notification message is sent after the interface 303 receives the service request message is measured.

Although the example illustrated in FIG. 7 illustrates an example of a service request message (S15) separated from a service start request message (S17), the service start request message (S17) may also be included in the service request message (S15). In this case, the terminal 200 sends the service request message (S15), and the monitoring control device 300 accumulates the clock time of receiving the service request message as the utilization start clock time and the number of times receiving the message as the traffic volume in the knowledge DB 305. The monitoring control device 300 also calculates a time period until a service delivery start notification is sent (S20) after receiving the service request message (S17) as the amount of delay time to accumulate the amount of delay time in the knowledge DB 305.

<4.2 QoE Calculation Process>

Figure 8:
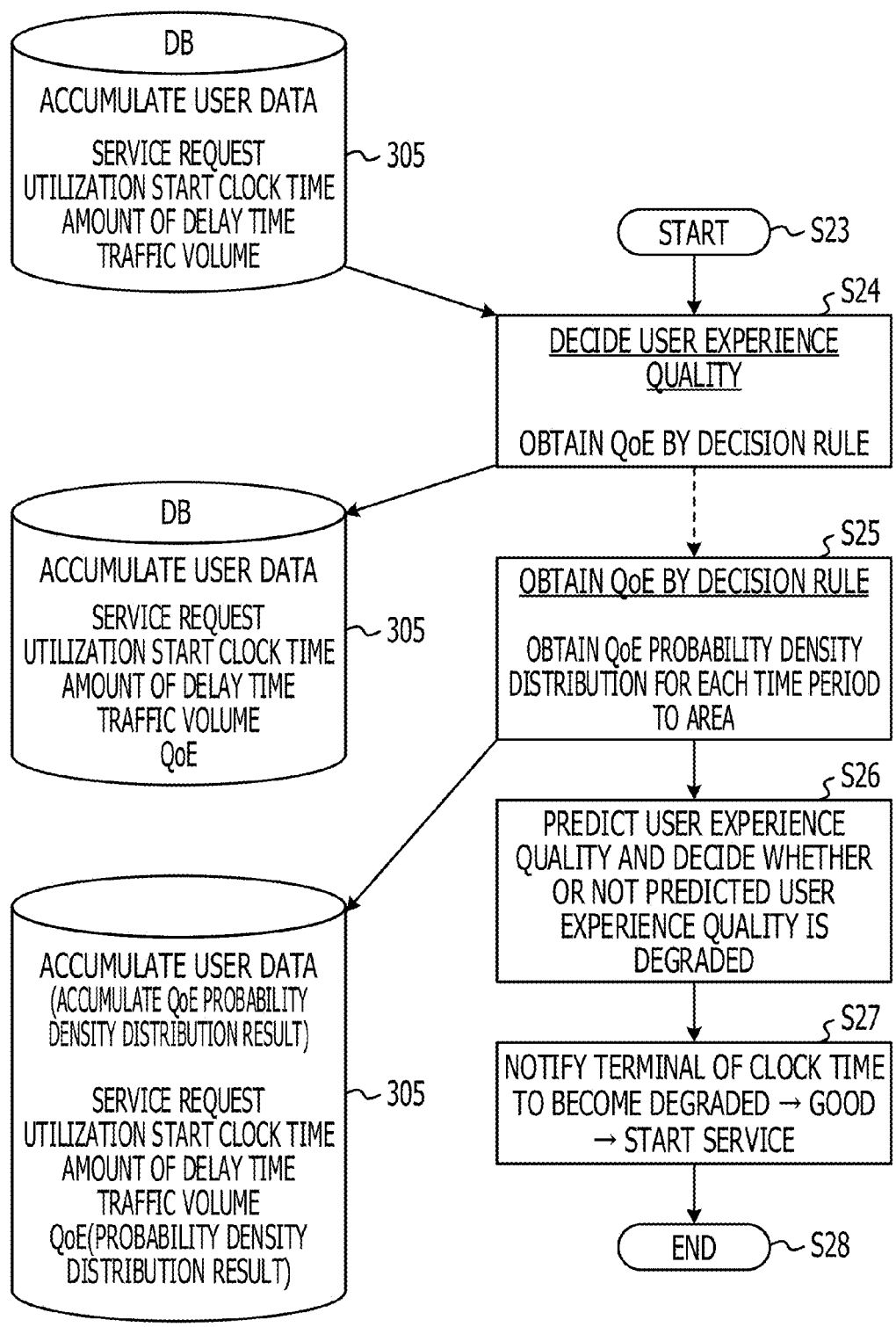
FIG. 8 illustrates an example of QoE calculation process.

The monitoring control device 300 carries out QoE calculation process after collecting user data. FIG. 8 is a flowchart illustrating an example of process including the QoE calculation process. FIG. 8 illustrates a flowchart carried out by the monitoring control device 300.

As starting the QoE calculation process (S23), the monitoring control device 300 calculates a QoE based on the user data accumulated in the knowledge DB 305 (S24). For example, the QoE calculation unit 304 calculates QoE based on the decision rules for the accumulated user data.

FIG. 9 illustrates an example of decision rules. In the example of FIG. 9, among the collected user data, a QoE is decided based on the traffic volume and the delay time. That is, where the traffic volume is "A" and the amount of delay time is "T", the traffic volume A is decided as "large" (when A≥1000), "medium" (100≤A<1000), or "small" (A<100) by comparison with thresholds ("100" and "1000"). The amount T of delay time is also decided as "large" (60<T), "medium" (5<T≤60), or "small" (T≤5). Based on the combination of the traffic volume of "large", "medium", and "small" and the amount of delay time of "large", "medium", and "small", "QoE (1)", "QoE (2)", and "QoE (3)" are calculated as the QoE. Here, among "QoE (1)" through "QoE (3)", the "QoE (3)" is the best QoE and the "QoE (1)" is the worst. For example, the QoE calculation unit 304 accumulates the calculated QoE in the knowledge DB 305 by combining with the location information and the utilization start clock time.

In FIG. 9, there are the columns indicating "others" because the amount of delay time is more than the respective threshold even though the traffic volume is less than the threshold, which is considered to be influenced by other factors so that the QoEs in that case are excluded.

The thresholds of the traffic volume ("100" and "1000") and the thresholds of the amount of delay time ("5" and "60") are appropriately modifiable by, for example, the QoE calculation unit 304 and the number of thresholds are also modifiable appropriately. Further, such QoE calculation may be at the timing of collecting the user data and may also be after accumulating the user data.

Further, in a condition where the data desired for QoE calculation is uncollected or less in the number of data items in the knowledge DB 305, a value may be set or an initial value based on operational findings may also be determined to the knowledge DB 305. A detailed procedure of initial value setting is described later in <4.6 Registration of initial value in knowledge DB>.

Back to FIG. 8, the monitoring control device 300 calculates, after calculating the QoE (S24), QoE probability density distribution for each given time interval regarding a QoE in each area to calculate a representative value of the QoEs in each group (S25).

The calculation of the probability density distribution and the representative value of the QoEs is carried out in the following manner, for example. That is, firstly, service coverage of the base station 100 is partitioned into each area in a given unit (for example, a 250 m square area). Then, the calculation of probability density distribution and the calculation of a representative value of the QoEs are carried out in the area for each given time interval.

For example, in a case that the area set value is "250 m" and the given time interval is "one minute", the monitoring control device 300 obtains an area to which the location information belongs relative to the QoE calculated by the decision rules (FIG. 9) using the location information stored in combination with the QoE to extract a QoE in the area in the past from the knowledge DB 305.

Next, the monitoring control device 300 groups, for example, the QoE calculated by the decision rules and the extracted QoE chronologically (for example, groups for each minute) and obtains probability density distribution for each group to accumulate a QoE having the highest probability density as a representative value of the QoEs in the group in the knowledge DB 305.

For example, such process is carried out based on the QoE received by the QoE probability density distribution calculation unit 306 from the QoE calculation unit 304 and the QoE read out of the knowledge DB 305. Then, the QoE probability density distribution calculation unit 306 accumulates the probability density distribution thus calculated and the representative value of the QoEs in each group in the knowledge DB 305 to output the probability density distribution and the representative value to the first QoE prediction unit 307.

FIG. 10 illustrates an example of the knowledge DB 305 thus accumulated. In the example of FIG. 10, the areas are partitioned into respective "area 1", "area 2", "area 3", . . . , and QoE having the highest probability density is accumulated for each given time interval ("one minute"), such as a time period from "8:00" to "8:01", in each area. For example, it is assumed that three QoEs of "QoE (1)", "QoE (2)", and "QoE (3)" are calculated in "area 1" in the time period from "8:00" to "8:01". In this case, the QoE having the highest probability density is QoE having the largest number of calculated items (for example, "QoE (1)") among the three QoEs.

In the example of FIG. 10, additional information, such as day of the week, feasts and holidays, and any event in session, for example, and the like may also be accumulated in the knowledge DB 305. For example, it is also possible to remove QoE indicating a traffic condition different from a normal period, such as when an event or an accident occurs, from the knowledge DB 305. The monitoring control device 300 is capable of appropriately setting such additional information.

Back to FIG. 8, after calculating the probability density distribution and the QoE (S25), the monitoring control device 300 predicts QoE at the timing when the user receives delivery of a service content based on the knowledge DB 305 (S26).

The prediction of QoE is carried out, for example, in the following manner. That is, as receiving a service request message from the terminal 200 (for example, S15 in FIG. 7), the monitoring control device 300 determines the corresponding "area" based on the location information included in the message. The monitoring control device 300 also determines a "target clock time" based on the clock time of receiving the message. Then, the monitoring control device 300 extracts QoE corresponding to the "area" and the "target clock time" thus determined from the knowledge DB 305.

For example, when the location information (for example, latitude and longitude information) included in the service request message corresponds to the "area 2" and the receiving clock time is "30 seconds after 8:00 a.m.", "08:00" as the "clock time information" and "QoE (1)" corresponding to the "area 2" are extracted from the knowledge DB 305.

The QoE thus extracted is also QoE that is predicted to be, for example, experienced by the user at that timing.

Then, the monitoring control device 300 decides whether or not the QoE deviates from determined quality tolerance by comparing, for example, the predicted QoE with a threshold (S26). As deciding as not degraded, the monitoring control device 300 starts delivery of a service content.

In contrast, as deciding as degraded, the monitoring control device 300 calculates a prediction clock time when the predicted QoE becomes good based on, for example, the knowledge DB 305 to notify the terminal 200 (S27).

For example, in the example illustrated in FIG. 10, when the threshold is "QoE (2)", the monitoring control device 300 decides that the QoE is not degraded in a case of "QoE (3)" or "QoE (2)", and decides that the QoE is degraded in a case of "QoE (1)".

For example, when QoE is decided as degraded in "area 1" at a current clock time of "08:00:00", the clock time when the QoE becomes "QoE (2)" or more is "08:07:00" or later. Accordingly, the monitoring control device 300 notifies the terminal 200 of a clock time of "7 minutes past 8 a.m." or later or a difference value from the current clock time as the information on the prediction clock time.

Back to FIG. 8, as terminating process after deciding the predicted QoE (S27), the monitoring control device 300 terminates a series of process (S28).

<4.3 Basic Behavior Process>

Figure 11:
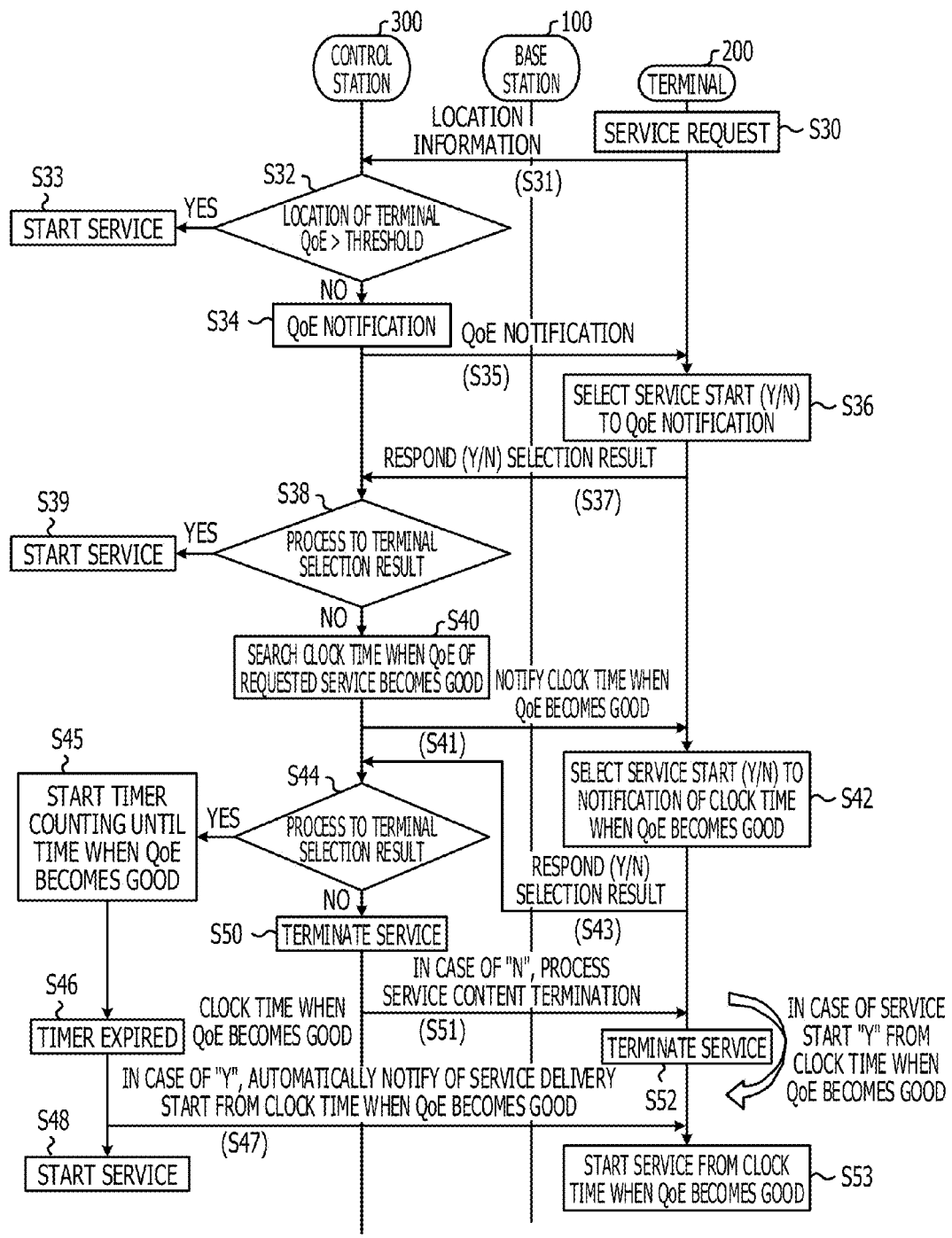
FIG. 11 illustrates a sequence diagram of a behavior example.

Next, a basic behavior of the entire mobile communication system 10 is described. FIG. 11 is a sequence diagram illustrating an example of a basic behavior. The example in FIG. 11 illustrates a behavior after the QoE is accumulated in the knowledge DB 305 by the probability density distribution (after the process of S25 in FIG. 8), and for example, illustrates a behavior example of the entire mobile communication system 10 corresponding to S26 and S27 in the flowchart in FIG. 8.

As the user requests utilization of a service via the terminal 200 (S30), the terminal 200 sends a service request message (S31). The terminal 200 measures location information at the timing of requesting the utilization of a service to send the location information thus measured including in the service request message.

As receiving the service request message via the base station 100, the monitoring control device 300 extracts QoE accumulated in the knowledge DB 305 based on the receiving clock time and the location information included in the service request message, thereby predicting the QoE (for example, corresponding to S26 in FIG. 8). Then, the monitoring control device 300 decides whether or not the predicted QoE is more than a threshold (or a QoE degradation decision threshold) (S32). For example, the first QoE prediction unit 307 predicts QoE and the QoE decision unit 308 decides whether or not the predicted QoE is degraded by comparing the predicted QoE with the threshold.

When the predicted QoE is more than the threshold (yes in S32), the monitoring control device 300 judges that the QoE at the timing of the service request by the terminal 200 is good and determines to start delivery of a service content (S33). In this case, the monitoring control device 300 sends a message to start delivery of a content service to the content server 600, thereby starting the delivery of a content service.

In contrast, when the predicted QoE is at the threshold or less (no in S32), the monitoring control device 300 decides that the QoE at the timing of the service request by the terminal 200 is degraded and notifies of the decision result (or QoE notification) (S35). For example, when the QoE predicted by the first QoE prediction unit 307 is the threshold or less, the QoE decision unit 308 directs the notification processing unit 310 to notify the terminal 200 of QoE notification of degradation.

As the terminal 200 receives the decision result of degradation, the user selects whether or not to start a content service (S36). For example, on the monitor screen of the terminal 200, whether or not to start a content service as well as the decision result of degradation are displayed.

Figure 12A:
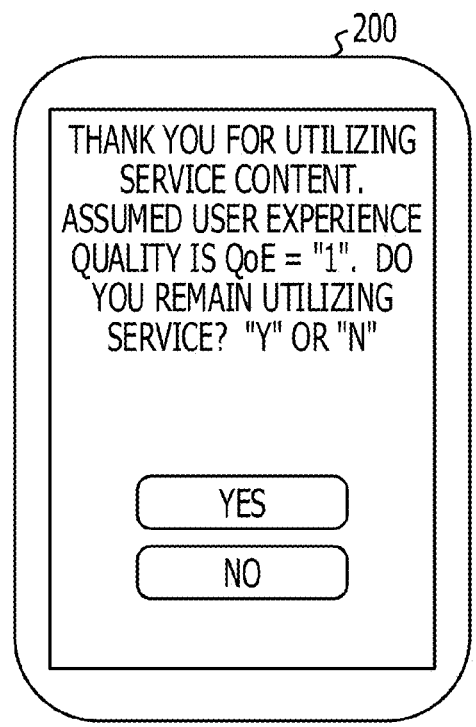
FIGS. 12A and 12B illustrate examples of a UE screen.

FIG. 12A illustrates a display example displayed on a monitor screen of the terminal 200. It is possible to make a user to select whether to start a content service ("yes") or not to start ("no"). This enables to help removal of frustration of a user by letting the user to select whether or not to start utilization of a content service directly although, for example, the QoE at the timing of starting a service is degraded.

Back to FIG. 11, the terminal 200 sends a response message indicating the selection result to the monitoring control device 300 (S37).

As receiving the response message, the monitoring control device 300 carries out process to correspond to the selection result (S38). That is, when the selection result indicates to start a content service (yes in S38), the monitoring control device 300 starts delivery of a content service (S39). For example, as receiving the selection result via the first QoE prediction unit 307 and the like, the QoE decision unit 308 directs to start delivery of a content service to the notification processing unit 310, thereby carrying out the process. In this case, for example, while the QoE is not good, it is expressed that the user allows receiving delivery of a service content with such QoE.

In contrast, when the selection result indicates not to start a content service (no in S38), the monitoring control device 300 predicts a clock time at which the QoE of the content service becomes good (S40). This process is process corresponding to, for example, the "degradation" of S27 in FIG. 8. For example, the QoE decision unit 308 predicts a clock time at which the QoE becomes good by searching the clock time when the QoE becomes "QoE (2)" in the area based on the knowledge DB 305 (for example, FIG. 10).

As predicting the clock time at which the QoE becomes good, the monitoring control device 300 notifies the terminal 200 of the predicted clock time information (S41). For example, the QoE decision unit 308 directs the notification processing unit 310 to notify the terminal 200 of the clock time information as well as the predicted clock time information, thereby carrying out the process.

As the terminal 200 receives the clock time information at which the QoE becomes good, selection whether or not to receive delivery of a content service from the clock time is carried out by the user (S42).

Figure 12B:
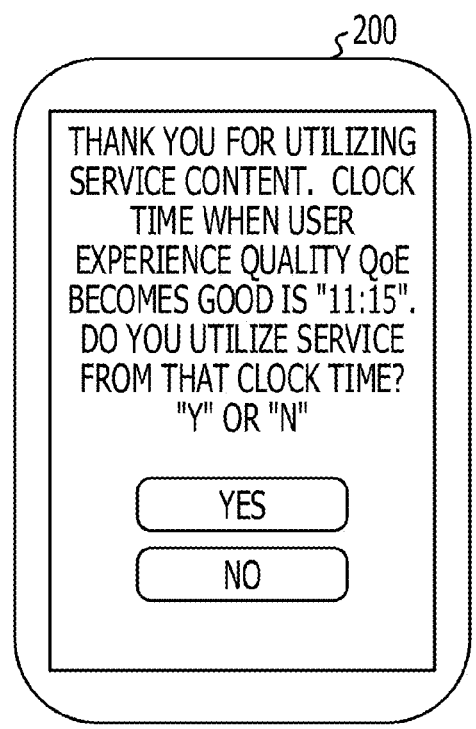

FIG. 12B illustrates an example of a display screen to be displayed on the monitor screen of the terminal 200 when the terminal 200 receives the clock time information. In the example of FIG. 12B, it is notified that the QoE becomes good at the time of "11:15", and the selection whether to receive delivery of a service from the clock time (yes) or not (no) is carried out by the user.

Back to FIG. 11, the terminal 200 sends a response message indicating the selection result to the monitoring control device 300 (S43).

As receiving the response message indicating the selection result, the monitoring control device 300 carries out process corresponding to the selection result (S44). That is, when the selection result indicates to receive delivery of a service from the prediction clock time (yes in S44), the monitoring control device 300 starts counting of a timer until the prediction clock time when the QoE becomes good (S45). For example, as receiving the selection result via the first QoE prediction unit 307 and the like, the QoE decision unit 308 starts counting of an internal timer.

Then, as the counting timer becomes the prediction clock time (S46), the monitoring control device 300 notifies the terminal 200 of starting delivery of a service content (S47). For example, as the counting timer becomes the prediction clock time, the QoE decision unit 308 directs the notification processing unit 310 to notify the terminal 200 of the start of content service delivery.

Further, the monitoring control device 300 directs the content server 600 to start of a content service, and delivery of a content service is carried out to the terminal 200 (S48). In the terminal 200, delivery of a content service is received from the clock time at which the QoE becomes good (S53). This carries out delivery of a content service from the clock time at which the QoE becomes good to, for example, the terminal 200 and enables the user to comfortably receive the service provision and to remove the frustration. In addition, because delivery of a service content from the clock time at which the QoE becomes good is predicted to have the QoE good in the terminal 200, the content server 600 is capable of delivering a service content to the terminal 200 without a delay.

In contrast, when the selection result indicates not to carry out delivery of a service from the prediction clock time (no in S44), the monitoring control device 300 determines to terminate a service (S50) and directs the terminal 200 to process service termination (S51). For example, as receiving the selection result from the first QoE prediction unit 307, the QoE decision unit 308 determines to terminate delivery of a content service to the terminal 200 and directs the notification processing unit 310 to notify the terminal 200 of service content termination process.

As receiving the message indicating service content termination process, the terminal 200 terminates the content delivery service (S52).

The monitoring control device 300 may also notifies, without notifying of the decision result of degradation (S35), of the clock time at which the QoE becomes good in the later part (S41). In this case, the mobile communication system 10 is also capable of not carrying out the process from S35 to S37.

<4.4 Behavior Example in Case of Given Travel Route>

Next, a behavior example in a case of a given travel route is described. In the above description of <4.3>, the descriptions are given to the behavior example in a case that the terminal 200 does not travel until the terminal 200 receives service provision after carrying out the service request. The present <4.4> is a case that the terminal 200 travels until receiving service provision since carrying out the service request and is also an example in a case of a given travel route. The present behavior example may include, for example, a case that a user utilizing the terminal 200 travels aboard a train, a bus, and the like. The travel routes of trains and buses are given, and the terminal 200 travels along such given travel route. In the descriptions below, taking a train as an example of a mobile entity (a manner of travel, hereinafter, may be referred to as a mobile entity), a case that a user utilizing the terminal 200 travels together with the train is described.

Figure 13:
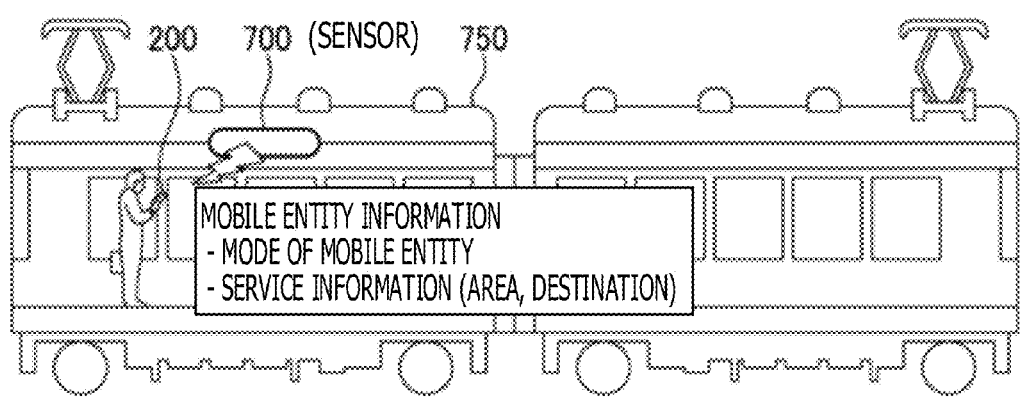
FIG. 13 illustrates an example of a sensor provided in a mobile entity.

FIG. 13 illustrates a state of a user utilizing the terminal 200 travelling together with a train 750. In the train 750, a sensor (or a small wireless device) 700 is equipped.

The sensor 700 sends mobile entity information, and the terminal 200 receives the mobile entity information. The mobile entity information may include, for example, a mode of mobile entity, a service area, a destination, location information, and the like. The terminal 200 sends, for example, the mobile entity information thus received to the monitoring control device 300 to carry out a request for a content service. In the present behavior example, the monitoring control device 300 predicts a place where QoE becomes good based on the mobile entity information and the like.

Figure 14:
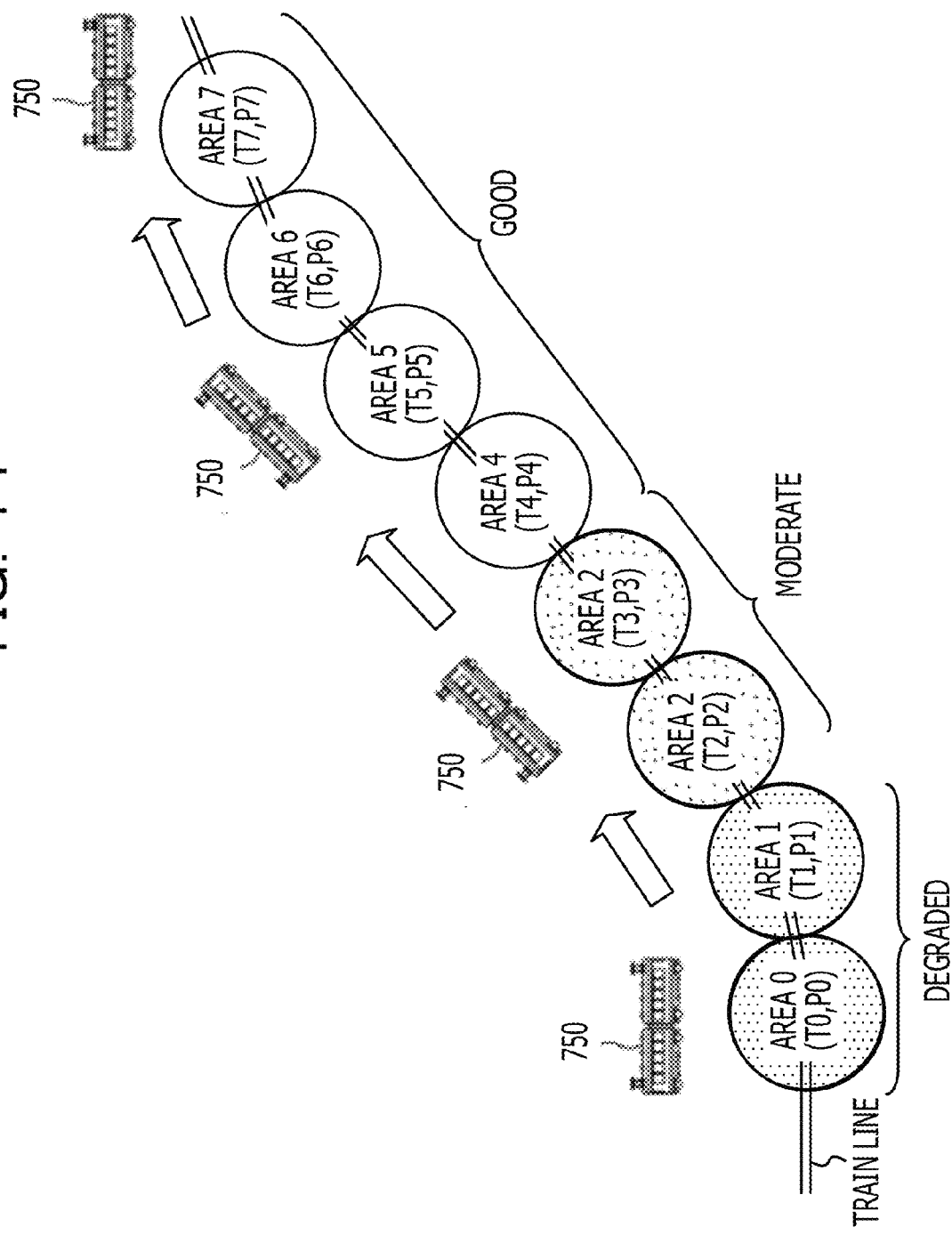
FIG. 14 illustrates an example of a travel route.

FIG. 14 illustrates an example of areas in the travel route and QoE in each area. In FIG. 14, in a case that the train 750 lies in a place (T0) (or "area 0") at a clock time (P0), it is illustrated that the QoE of the terminal 200 in the train 750 is "degraded". It is also expressed that the QoE of the terminal 200 in a place (T3) becomes "moderate" when the train 750 travels to the place (T3) at a clock time (P3) and the QoE of the terminal 200 becomes "good" when the train 750 travels to a place (T5).

In a case of a given travel route, when a clock time (PX) is fixed, a place (TX) is also determined uniquely, and that the monitoring control device 300 predicts the place (TX) where QoE becomes good is possible to be considered same as to predict the clock time (PX) at which the QoE becomes good.

The example illustrated in FIG. 14 is one example, and the monitoring control device 300 is capable of arbitrarily setting a time interval (or each place) of QoE to become good.

Figure 15:
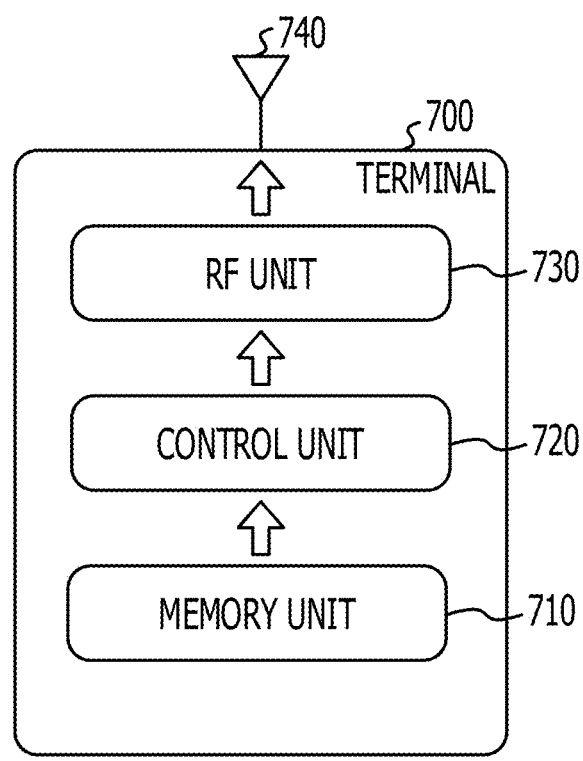
FIG. 15 illustrates a configuration example of a sensor.

FIG. 15 illustrates a configuration example of the sensor 700. The sensor 700 is provided with a memory unit 710, a control unit 720, an RF unit 730, and an antenna 740.

The memory unit 710 stores, for example, the mobile entity information.

The control unit 720 reads the mobile entity information stored in the memory unit 710 out of the memory unit 710 to be outputted to the RF unit 730 by applying modulation process or the like.

As receiving the mobile entity information subjected to the modulation process or the like from the control unit 720, the RF unit 730 converts the mobile entity information to a wireless signal in the radio band to output the wireless signal after the conversion to the antenna 740.

The antenna 740 sends the wireless signal received from the RF unit 730.

For example, the control unit 720 periodically reads out the mobile entity information stored in the memory unit 710 to output the mobile entity information to the RF unit 730, thereby periodically sending the mobile entity information.

Figure 16B:
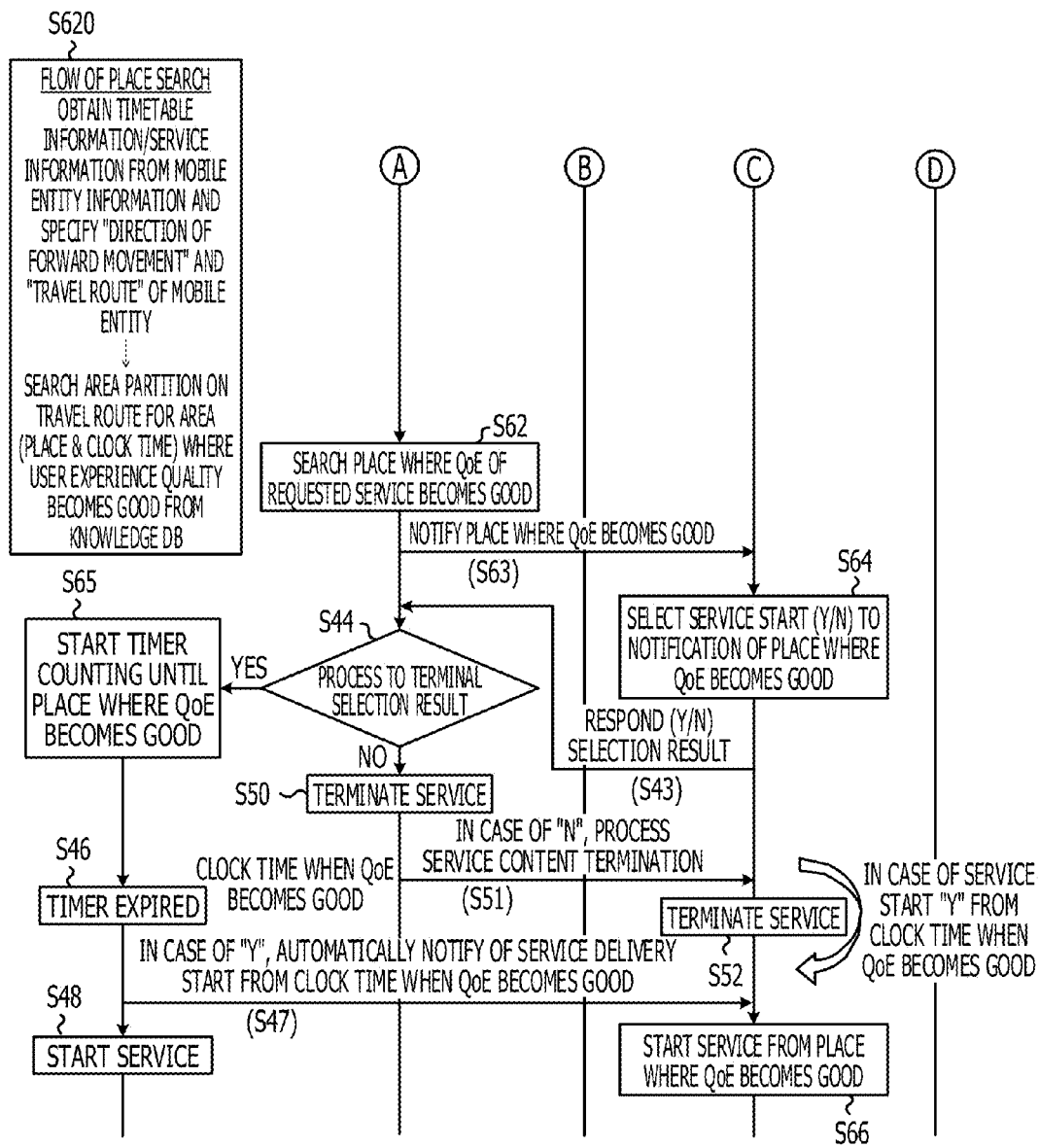

FIGS. 16A and 16B illustrate a sequence example of the present behavior example. An identical reference character is assigned to process identical to FIG. 11.

The sensor 700 sends the mobile entity information (S60), and the terminal 200 obtains the mobile entity information in the train 750. The mobile entity information may include, for example, "train" (=mode of mobile entity), "between Ofuna-Omiya" (=service area), "Omiya" (=destination), "Kawasaki" (=location information), and the like. Such mobile entity information expresses that, for example, a user utilizing the terminal 200 is boarding the train 750, having a service area of "between Ofuna-Omiya" and a destination of "Omiya", from "Kawasaki" station.

Subsequently, the terminal 200 determines to carry out a service request (S30) and sends a service request message to the monitoring control device 300 (S61). The terminal 200 sends the service request message included the mobile entity information.

Since the process to the selection result of the terminal 200 (S32 to S39) after the monitoring control device 300 receives the service request message is identical to <4.3>, the descriptions are omitted.

When deciding that the predicted QoE is degraded (no in S32) and when the selection result of the terminal 200 does not select starting a service (no in S38), the monitoring control device 300 predicts (or searches) a place where QoE becomes good (S62).

Since the travel route of the train 750 is given, the monitoring control device 300 is capable of calculating in which direction (for example, "up direction", "Omiya direction", and the like) the train 750 travels utilizing which route ("Keihin-Tohoku Line") from a current spot (T0) based on, for example, the location information ("Kawasaki"), the service area ("between Ofuna-Omiya"), the destination ("Omiya"), map information, and the like. Accordingly, the monitoring control device 300 is capable of calculating, for example, places (TX) (or areas) to pass through until reaching the destination ("Omiya") from the current spot (T0).

The monitoring control device 300 is also capable of determining a travel speed of the mobile entity from, for example, the mobile entity mode information ("train"), and further also capable of calculating a clock time (PX) to reach each place (TX) to pass through from the current spot (T0) based on the travel speed, service timetable information of the train 750, and the like.

Accordingly, the monitoring control device 300 is capable of calculating each place (TX) (or area) to pass through and the clock time (PX) to reach the place as illustrated in, for example, FIG. 14 based on the mobile entity information. Then, the monitoring control device 300 is capable of predicting QoE by extracting QoE in each place at each clock time from the knowledge DB 305 using, for example, the calculated place (TX) and the clock time (PX) for search keys. Accordingly, the monitoring control device 300 is also capable of searching a place (T4) where QoE becomes good from the knowledge DB 305 in the present behavior example as well.

That is, the monitoring control device 300 specifies the "direction of forward movement" and the "travel route" from the mobile entity information and searches a place (and a clock time) where QoE in each area (or each place (TX)) becomes good from the knowledge DB 305 in area partitions on the travel route (S620 in FIG. 16B).

Then, the monitoring control device 300 notifies the terminal 200 of the place where QoE becomes good (S63).

As receiving the notification of the place where QoE becomes good, the terminal 200 selects whether or not to start a service from the place (S64) and notifies of the result (S43). FIG. 12B illustrates an example in which the clock time at which the QoE becomes good is displayed on the monitor screen of the terminal 200 whereas, for example, a monitor screen substituting a place for the clock time is displayed in the terminal 200.

Back to FIG. 16B, when it is selected to carry out start of a service when reaching the place where QoE becomes good (yes in S44), the monitoring control device 300 starts counting of a timer until reaching the place (S65). For example, since the monitoring control device 300 searches the clock time (PX) to reach each area from the current spot (T0) based on the travel speed, the service timetable information of the train 750, and the like, the time period until reaching the clock time may also be counted.

Then, as the timer is expired, the monitoring control device 300 sends a service delivery start notification to the terminal 200 (S47), and the delivery of a content service is started from the content server 600 (S66).

Since the terminal 200 is also capable of receiving content service provision in the place where QoE becomes good in the present behavior example as well, a user is possible to comfortably receive the service provision and to remove frustration, for example. In addition, since the terminal 200 receives the delivery of a service content in the place where QoE becomes good, the content server 600 is capable of delivering a service content to the terminal 200 without a delay. Further, places to provide content services to the terminals 200 in the content server 600 are also dispersed and thus the places to be concentrated for the content service provision become less, which enables to keep from congestion.

In the present behavior example, accumulation in the knowledge DB 305, calculation of QoE probability density distribution, and the like are possible to be processed by, for example, the behavior example described in <4.1> (FIG. 8 and the like).

That is, the terminal 200 sends the mobile entity information obtained from the sensor 700 to the monitoring control device 300 (S60, S61 in FIG. 16A), and the monitoring control device 300 accumulates the location information included in the mobile entity information and the clock time of receiving the mobile entity information in the knowledge DB 305 and calculates QoE individually (S24 in FIG. 8). Then, the monitoring control device 300 calculates the QoE probability density distribution and accumulates the QoE of each group in the knowledge DB 305 (for example, FIG. 10). The monitoring control device 300 carries out QoE prediction (S32), place search (S62, S620), and the like utilizing the knowledge DB 305 thus accumulated.

<4.5 Behavior Example in Case of Unidentified Travel Route>

In the above description of <4.4>, the descriptions are given to the behavior example in a case that the travel route of the mobile entity is given. In the present <4.5>, descriptions are given to a behavior example in a case of an unidentified travel route. The present behavior example may include, for example, a case that the user utilizing the terminal 200 travels together with an automobile, a motorcycle, a bicycle, or the like. In the present behavior example, descriptions are given taking an automobile as an example of the mobile entity.

Figure 17A:
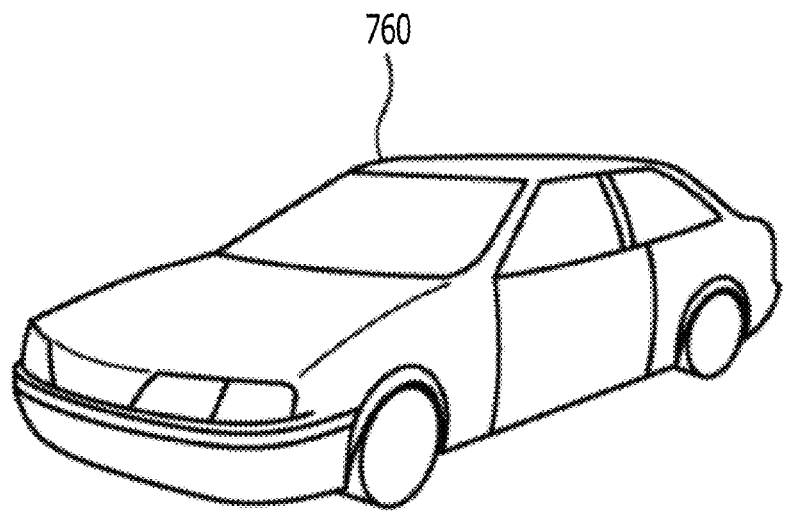
FIGS. 17A and 17B illustrate examples of a sensor provided in a vehicle.
Figure 17B:
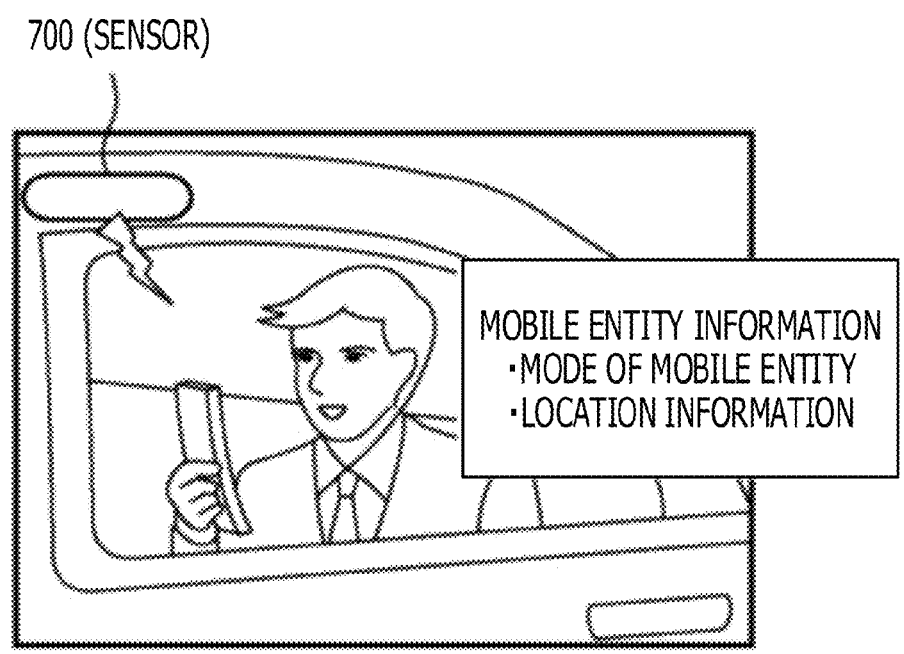

FIGS. 17A and 17B illustrate an example of the sensor 700 equipped in an automobile 760. In the present behavior example as well, the terminal 200 is supposed to be capable of obtaining the mobile entity information from the sensor 700. The mobile entity information includes a mode of mobile entity and location information. For example, the mode of mobile entity indicates whether to be the automobile 760, a bicycle, or the like, and the location information indicates latitude and longitude of the current location. Even when the mobile entity is a motorcycle or a bicycle, the motorcycle or the bicycle is supposed to be provided with the sensor 700.

Figure 18A:
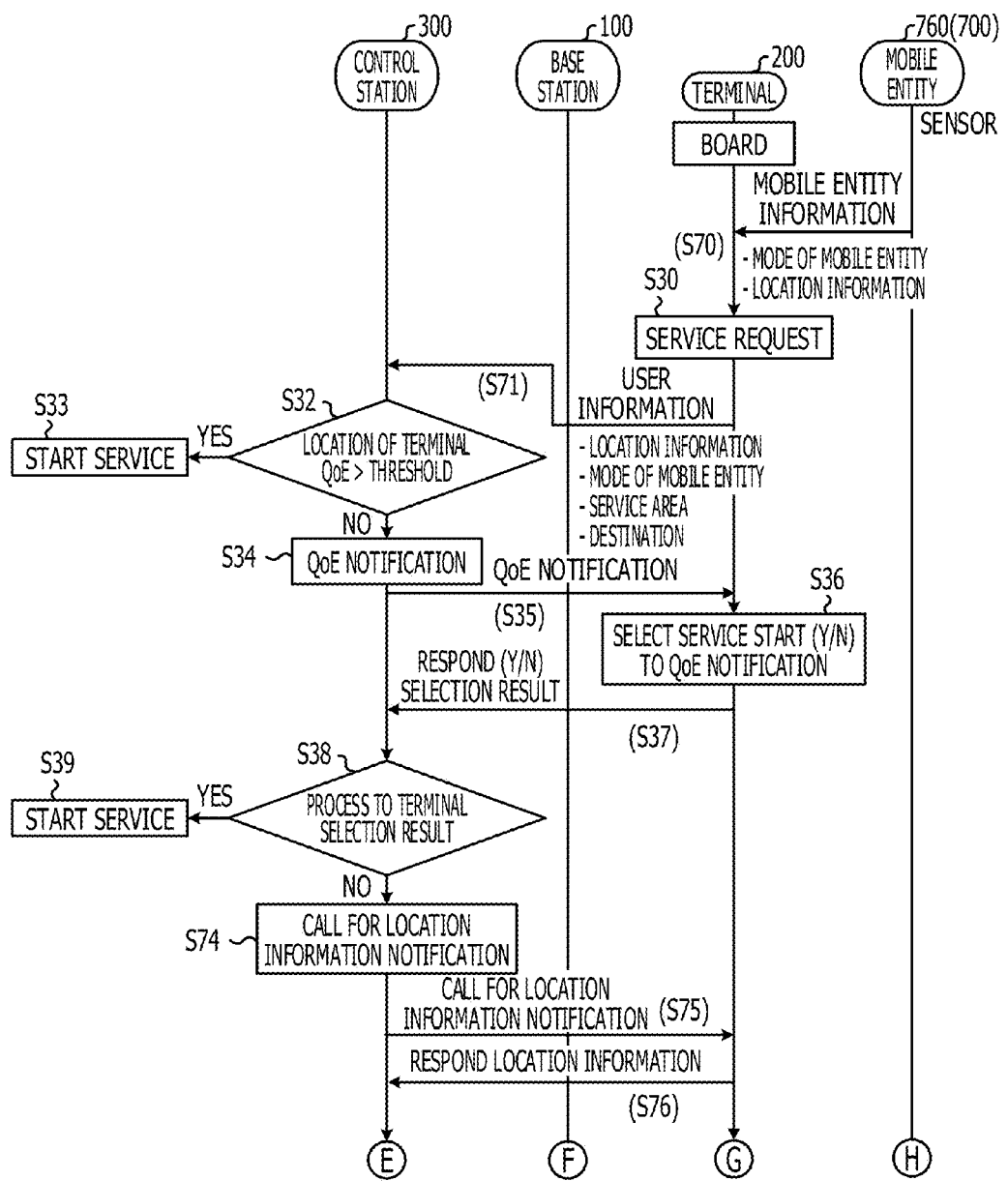
FIGS. 18A and 18B illustrate a sequence diagram of still another behavior example.
Figure 18B:
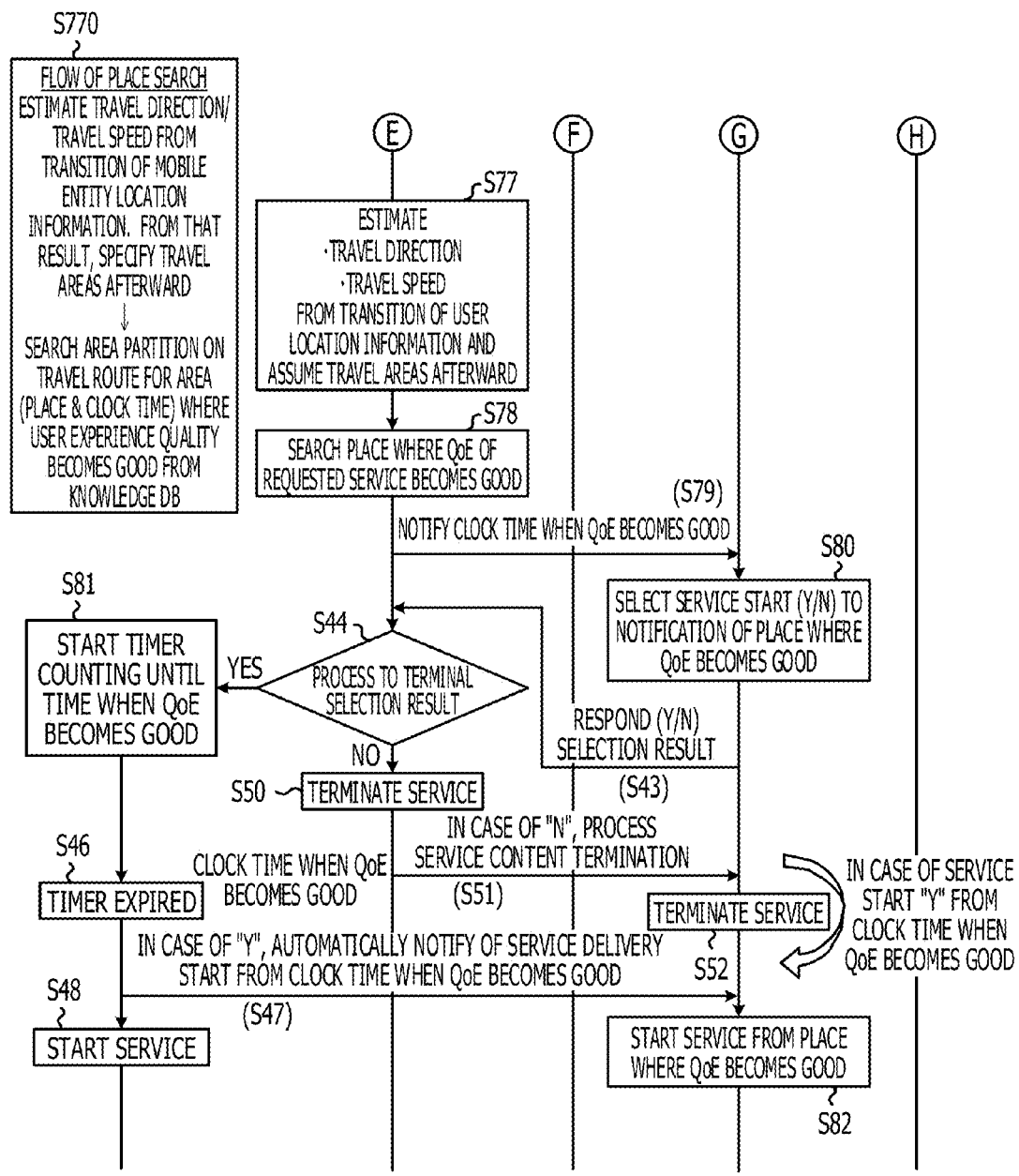

FIGS. 18A and 18B illustrate a sequence example of the present behavior example. An identical reference character is assigned to process identical to FIG. 11.

A user utilizing the terminal 200 boards the automobile 760, and the terminal 200 obtains the mobile entity information from the sensor 700 in the automobile 760 (S70). In a case that the mobile entity does not have a manner to obtain the location information, the terminal 200 may also use location information obtained by itself with GPS and the like.

Subsequently, the terminal 200 determines to carry out a service request (S30), and sends a service request message including mobile entity information to the monitoring control device 300 (S71).

When the predicted QoE is decided as degraded (no in S32) and the selection result in the terminal 200 does not select starting a service (no in S38), the monitoring control device 300 determines to carry out a call for location information notification (S74) and sends a message indicating the call for location information notification to the terminal 200 (S75).

As receiving the message of the call for location information notification, the terminal 200 sends the location information obtained by GPS and the like including in a response message to the monitoring control device 300 (S76).

The monitoring control device 300 estimates a travel direction and a travel speed of the terminal 200 (or the automobile 760) based on the location information obtained by the process in S71 and the location information obtained by the process in S76, to calculate travel areas afterward (S77).

For example, the travel direction of the terminal 200 is possible to be calculated from the difference between the two sorts of the location information. The travel speed of the terminal 200 is possible to be calculated from the mode of mobile entity included in the mobile entity information similar to the case of a given travel route. Then, the monitoring control device 300 is also capable of calculating travel places (or travel areas) where the terminal 200 is expected to travel and expected arrival clock times from the travel direction and the travel speed thus calculated. Such calculation of travel places and arrival clock times is carried out based on, for example, the two sorts of the location information and the like obtained via the first QoE prediction unit 307 and the like in the QoE decision unit 308.

Subsequently, the monitoring control device 300 predicts a place where QoE becomes good (S78). For example, the QoE decision unit 308 searches the knowledge DB 305 using the travel places and the arrival clock times for search keys similar to the case of a given travel route to extract a place where QoE becomes good.

Then, the monitoring control device 300 notifies the terminal 200 of the place where QoE becomes good (S79).

As receiving a notification of the place where QoE becomes good, the terminal 200 selects whether or not to start a service from the place (S80) and notifies of the result (S43).

When carrying out start of a service when reaching the place where QoE becomes good is selected (yes in S44), the monitoring control device 300 starts counting of a timer until reaching the place (S81).

As the timer is expired, the monitoring control device 300 sends a delivery request message to the content server 600, and delivery of a service content is carried out from the content server 600 to the terminal 200 (S82).

In the present behavior example as well, the terminal 200 receives the content service provision in the place where QoE becomes good, thereby enabling to remove frustration. In addition, since the terminal 200 receives the delivery of a service content in the place where QoE becomes good, the content server 600 is capable of delivering a service content to the terminal 200 without a delay. Further, places to provide content services to the terminals 200 in the content server 600 are also dispersed and thus the places to be concentrated for the content service provision become less, which enables to keep from congestion.

In the present behavior example as well, the monitoring control device 300 is also capable of arbitrarily setting a time interval (for example, for each 10 minutes or the like) (or each place) of QoE to become good.

In the present behavior example, accumulation in the knowledge DB 305, calculation of QoE probability density distribution, and the like are also possible to be carried out by process, for example, identical to the example in the case of a given travel route (above <4.4>).

<4.6 Registration of Initial Value in Knowledge DB>

In an initial operation of the present mobile communication system 10, it is assumed that a number of samples in the knowledge DB 305 is less and accuracy of QoE is low. With that, in the monitoring control device 300, when the number of samples is not sufficient, QoE is accumulated in the knowledge DB 305 using initial DB decision rules. This enables to accumulate QoE of high accuracy even in a case that, for example, the number of QoE samples accumulated in the knowledge DB 305 is not sufficient.

Figure 19:
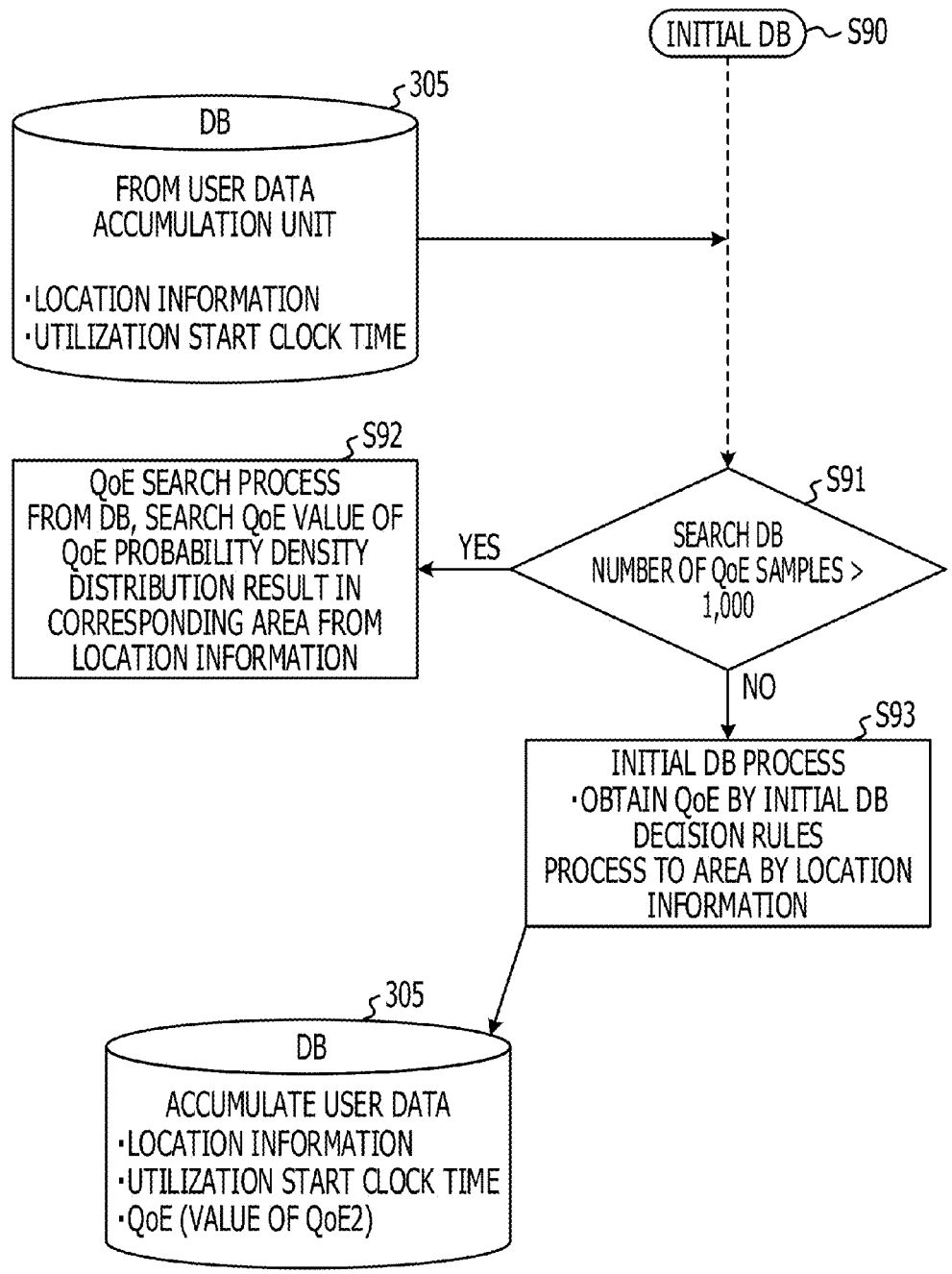
FIG. 19 illustrates an example of initial DB process to a knowledge DB.

FIG. 19 is a flowchart illustrating an example of initial DB process to the knowledge DB 305. As starting the process (S90), the monitoring control device 300 calculates the number of all QoE samples accumulated in the knowledge DB 305 to decide whether or not the number of samples exceeds "1000" (S91). The number "1000" is, for example, an example of the threshold indicating whether or not the number of samples is sufficient, and may also be a number other than 1000.

When the number of samples is "1000" or less (N in S91), the monitoring control device 300 carries out initial DB process using the initial DB decision rules (S93).

FIG. 20 illustrates an example of the initial DB decision rules. To the map information, various kinds of attribute information are added together with map data. In the knowledge DB 305, for example, such attribute information is stored as a database together with the map data. The attribute information may include, for example, an area category of each area and presence of a station in each area. The area category indicates that, for example, each area is in a high-rise buildings area, a commercial area, a residential area, or a rural area. For example, the attribute information is accumulated as a database for each area, and each area of the attribute information corresponds to each area registered in the knowledge DB 305 (for example, FIG. 10) one-to-one.

In the initial DB decision rules, QoE in each area is calculated based on the two sorts of attribute information of the area category and the presence of a station and is accumulated in the knowledge DB 305. In the example of FIG. 20, in a case that the area is of "high-rise buildings" (dense urban (metropolitan area)), high traffic is expected, so that the QoE becomes "1" (=QoE (1)). In a case that the area is of commercial (urban), a high traffic to a certain extent is expected, so that the QoE becomes "2" (=QoE (2)), and the residential (sub-urban) and rural areas are expected to be medium and low in traffic, respectively, so that the QoEs become "3" (=QoE (3)).

Further, in a case that there is a station in the area ("station existing"), high traffic is expected, so that "(QoE determined by the area category)−1" is assumed to be QoE in the area. In contrast, in a case that there is no station in the area ("no station"), low traffic is assumed, so that the value of QoE determined by the area category remains maintained.

FIG. 21 illustrates an example of QoE decided by such initial DB decision rules, and an "assumed QoE" is accumulated in the knowledge DB 305.

When initially operating the mobile communication system 10, a clock time and a place in which the QoE becomes good and the like are searched utilizing the knowledge DB 305 thus accumulated by the initial DB decision rules.

<4.7 Flow of Each Process>

Next, descriptions are given to each process carried out by the monitoring control device 300 in the behavior example described above. FIGS. 22A through 28 are flowcharts illustrating an example of each process. Since some of the process overlaps the behavior example described above, brief descriptions are given.

Figure 22A:
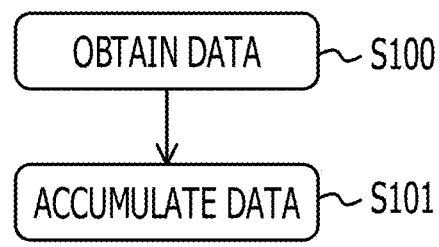
FIGS. 22A and 22B are flowcharts illustrating examples of data accumulation process.
Figure 22B:
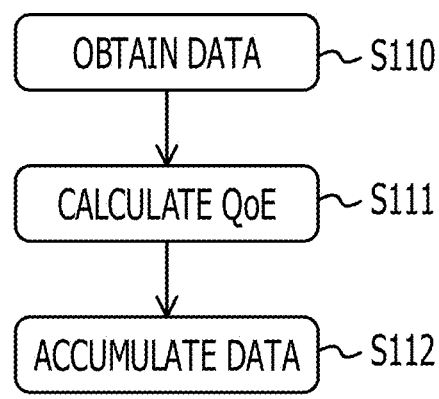

FIGS. 22A and 22B illustrate examples of data accumulation process in a case of obtaining data from the terminal 200 in the monitoring control device 300. These examples correspond to, for example, collection of user data (for example, S11 in FIG. 6) and QoE calculation (for example, S24 in FIG. 8).

In the example of FIG. 22A, the monitoring control device 300 accumulates the obtained data directly in the data accumulation unit (or knowledge DB) 305 (S100, S101). In contrast, in the example of FIG. 22B, the monitoring control device 300 calculates QoE and the calculated QoE is accumulated in the data accumulation unit 305 (S110 to S112). In this case, the monitoring control device 300 may also accumulate the obtained data in the data accumulation unit 305.

In the examples of FIGS. 22A and 22B, the data to be accumulated may include location information of the terminal 200 (such as S31 in FIG. 11), mobile entity information (such as S61 in FIG. 16A), and the like.

Figure 23A:
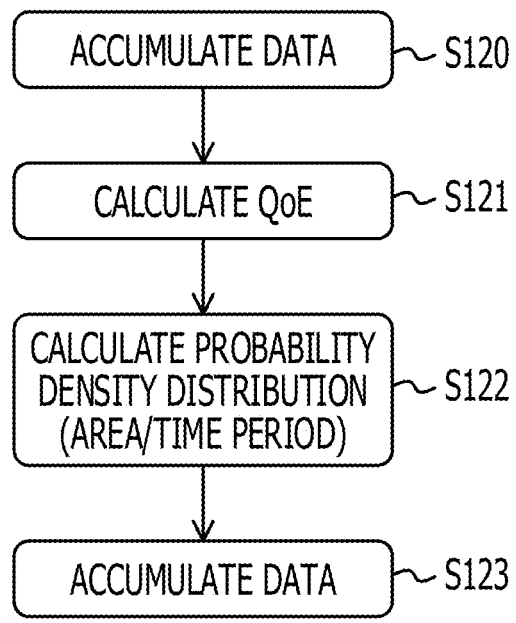
FIGS. 23A and 23B are flowcharts illustrating examples of probability density distribution process.
Figure 23B:
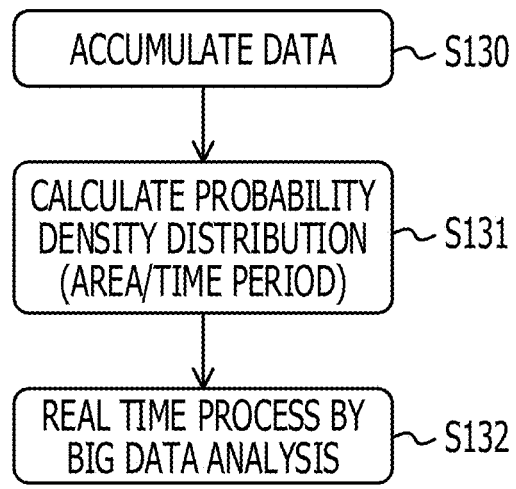

FIGS. 23A and 23B are flowcharts illustrating examples of probability density distribution process. The probability density distribution process corresponds to, for example, S25 in FIG. 8.

In the example of FIG. 23A, the monitoring control device 300 reads QoE out of the data accumulation unit 305, calculates the probability density distribution, and accumulates the probability density distribution in the knowledge DB 305 (S120 to S123). For example, the QoE probability density distribution calculation unit 306 reads QoE for each area and time period out of the data accumulation unit 305, and accumulates the QoE having the highest probability density in the group in the knowledge DB 305.

In contrast, the example of FIG. 23B is an example in a case that the monitoring control device 300 is capable of real time process by a big data analysis, and the probability density distribution is instantly calculated from the accumulated data to be accumulated in the knowledge DB 305 (S130 to S132).

Figure 24:
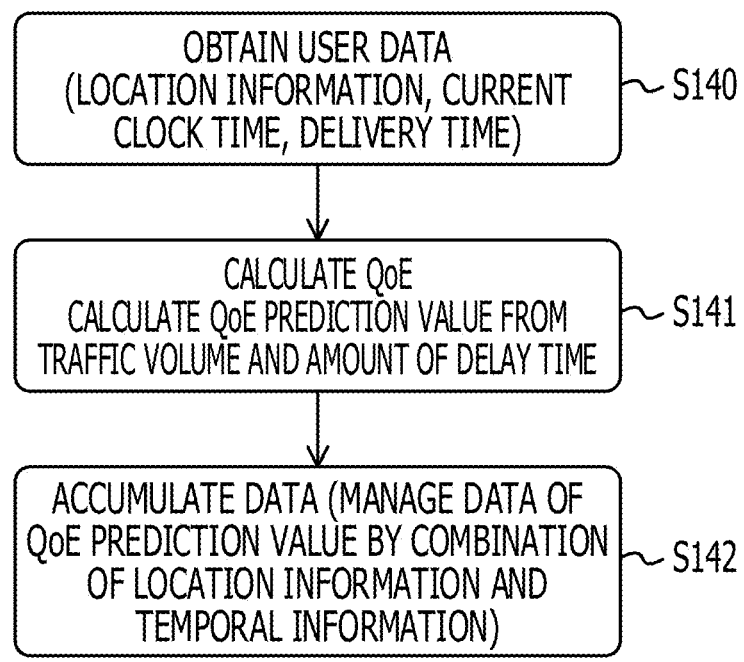
FIG. 24 is a flowchart illustrating an example of QoE calculation process.

FIG. 24 is a flowchart illustrating an example of QoE calculation process. FIG. 24 is also a detailed flowchart of the process in FIG. 22B.

As obtaining the user data (S140), the monitoring control device 300 calculates QoE based on the traffic volume and the amount of delay time utilizing the QoE decision rules (for example, FIG. 9) (S141). The monitoring control device 300 accumulates the calculated QoE in the data accumulation unit 305 (S142).

Figure 25:
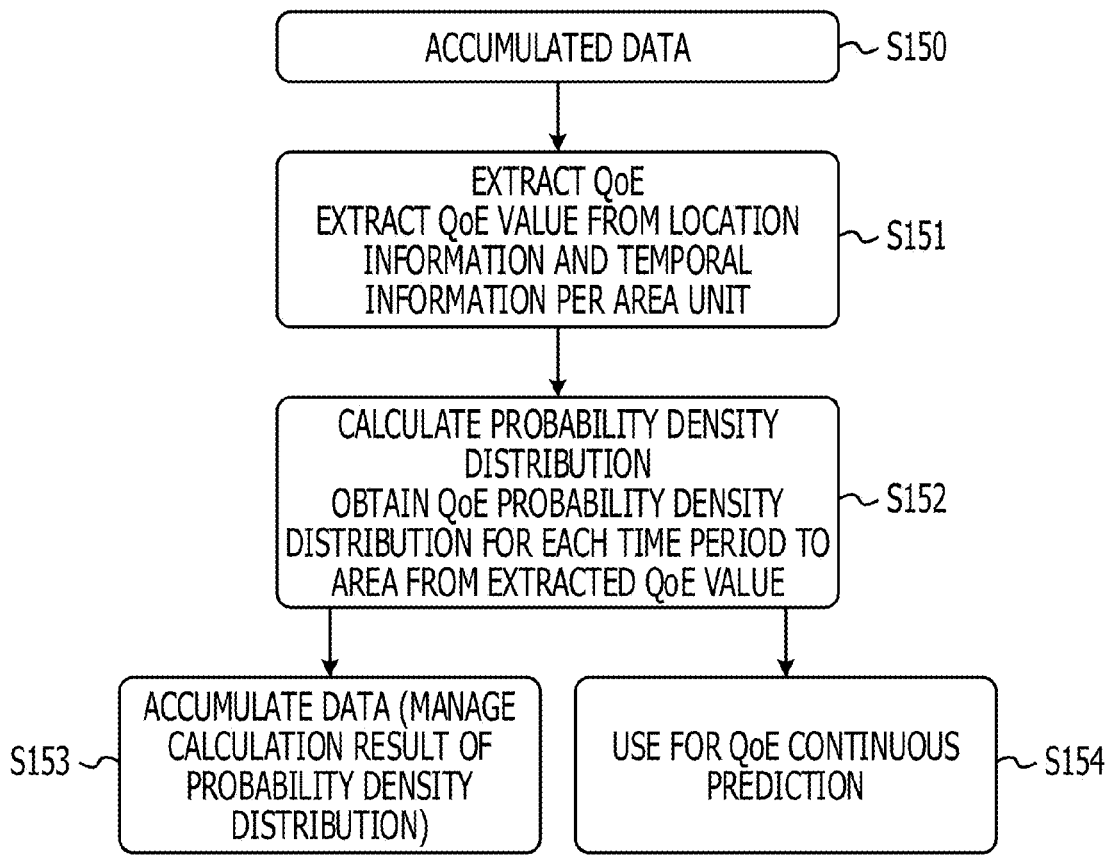
FIG. 25 is a flowchart illustrating an example of QoE probability density distribution calculation process.

FIG. 25 is a flowchart illustrating an example of probability density distribution process, and for example, is also a detailed flowchart of the process as illustrated in FIG. 23A.

The monitoring control device 300 extracts QoE from the data accumulation unit 305 (S151), calculates QoE probability density distribution (S152), and accumulates, for example, QoE having the highest probability density in the knowledge DB 305 as QoE of the group (S153). In the meanwhile, the QoE accumulated in the knowledge DB 305 is utilized for the QoE prediction (S32 in FIG. 11) in the group (S154).

Figure 26:
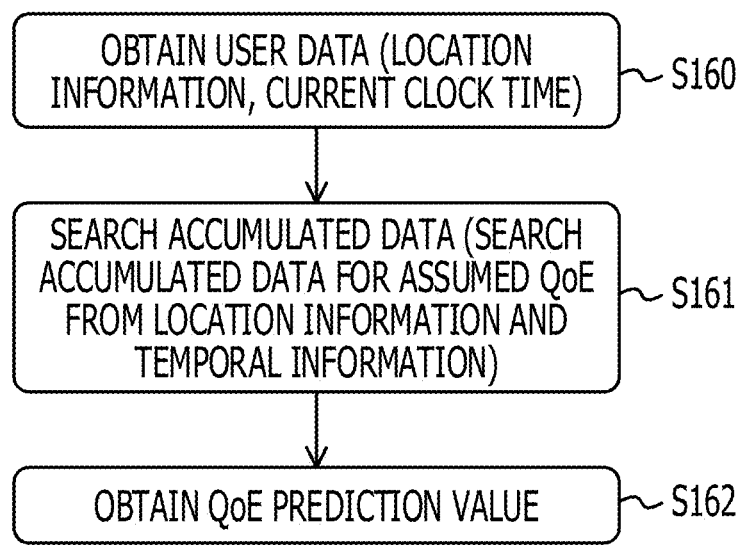
FIG. 26 is a flowchart illustrating an example of QoE prediction process.

FIG. 26 is a flowchart illustrating an example of QoE prediction process. This process is also the process corresponding to S32 in FIG. 11, for example.

The monitoring control device 300 obtains user data by, for example, receiving a service request message (S160). Then, the monitoring control device 300 extracts QoE from the knowledge DB 305 using the location information and the clock time for search keys (S161 and S162). The QoE thus extracted is, for example, QoE that is predicted to receive when the user receives delivery of a service content.

Figure 27:
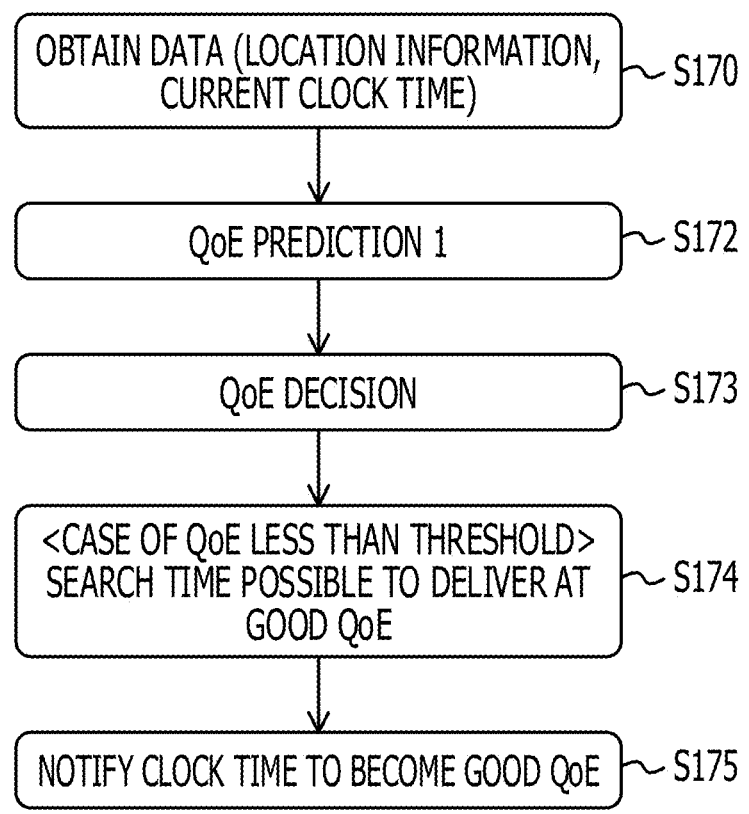
FIG. 27 is a flowchart illustrating an example of process when utilizing a service.

FIG. 27 is a flowchart illustrating an example of process when a user utilizes a service. This process includes, for example, process from S32 to S41 in FIG. 11 and process illustrated in FIG. 26.

As receiving a service request message, the monitoring control device 300 obtains the location information and the clock time and extracts QoE from the knowledge DB 305 (S170 and S171).

The monitoring control device 300 decides whether or not the extracted QoE is at a threshold or less comparing the QoE with the threshold (S173). Then, as deciding that the QoE is at the threshold or less, the monitoring control device 300 searches a clock time when it is possible to deliver at good QoE from the knowledge DB 305 (S174) and notifies of the clock time thus searched (S175). The searched target may also be a place not only the clock time.

Figure 28:
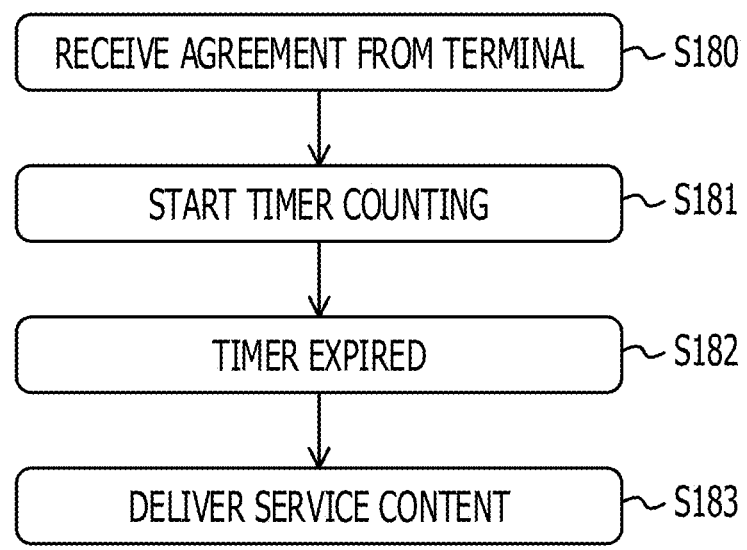
FIG. 28 is a flowchart illustrating an example of process in a case of providing a service.

FIG. 28 is a flowchart illustrating an example of service provision process. This process corresponds to, for example, process from S43 to S48 in FIG. 11.

As receiving a message to agree with starting a service from the clock time at which the QoE becomes good from the terminal 200 (S180), the monitoring control device 300 starts counting of a timer (S181). As the timer of the timer counting thus started is expired (S182), the monitoring control device 300 directs the content server 600 to deliver a service content (S183). By the direction, the service content is delivered from the content server 600 to the terminal 200.

<4.8 Prediction and Improvement of QoE>

Next, descriptions are given to QoE prediction. Regarding the QoE, particularly in probability density distribution calculation (for example, FIG. 25), there is a case that QoE calculated in the past is utilized. In this case, as long as the monitoring control device 300, for example, is capable of predicting a temporal transition of the QoE to decide whether the transition is in a good direction or the transition is in a degrading direction, it is also capable of carrying out provision of a service in accordance with the QoE level. In the following descriptions, prediction of a QoE transition is described appropriately with reference to FIGS. 29 through 37.

Figure 29:
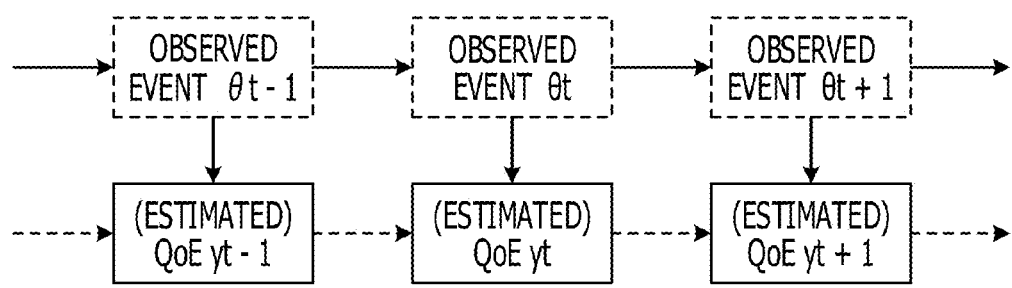
FIG. 29 illustrates an example of relationship between observed events and estimated events.

FIG. 29 illustrates an example of a model related to QoE prediction. For example, there is an observed event θt at a certain clock time t. The observed event may include, for example, the location information, the clock time information, and the like. Relative to such observed event θt, QoE (t) is estimated (or predicted). For example, QoE accumulated in the knowledge DB 305 is extracted, thereby estimating QoE. As the estimated QoE, relative to an observed event θt−1 at a clock time (t−1) and an observed event θt+1 at a clock time (t+1) as well, QoE (t−1) and QoE (t+1) are estimated, respectively.

Here, QoE at certain timing may be regarded as independent from individual QoEs before that (for example, Markov chain). That is, QoE (t) at a clock time t depends on the communication environment and the like at the clock time t, and QoE (t+1) at the following clock time (t+1) also depends on the communication environment at the clock time (t+1). However, variable factors, such as the communication environment at the clock time (t), do not depend on the factors, such as the communication environment at the timing of the clock time (t−1). Accordingly, the QoE at each clock time may be regarded as an independent event.

That is, it is possible to consider that, for the QoE (t) at the clock time (t), the QoE (t+1) that may become at the following clock time (t+1) is a form of stochastic process.

Figure 30:
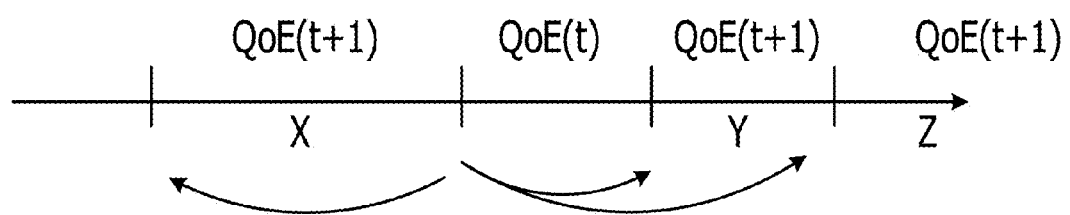
FIG. 30 illustrates an example of QoE appearing on a time axis.

FIG. 30 illustrates such stochastic process. For example, in a case that the QoE (t) is obtained at the clock time (t), the QoE (t+1) at the following clock time (t+1) may be regarded as appearing (or transiting) at any of "X", "Y", or "Z" in FIG. 30.

Here, the asymmetric tracking model in which, among improvement in quality and decline in quality, the decline is evaluated more strongly due to the influence of human psychological factors is supposed to be considered. Considering such point, due to appearance of a worst value=a minimum point among the QoEs observed by the current clock time, the observation (or selection) is cancelled and QoE transition probability is to be obtained. That is, QoE transition is calculated based on QoE observation results in several times not measuring QoEs over the all time intervals.

Figure 31:
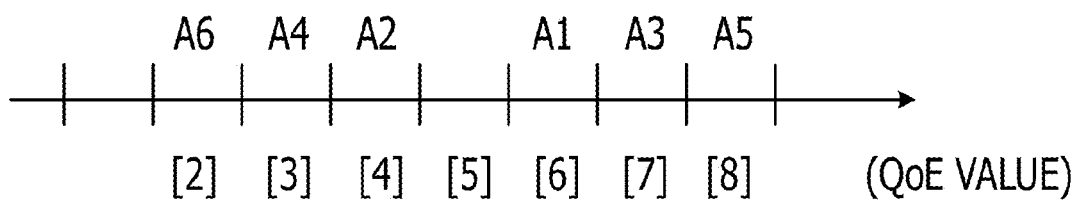
FIG. 31 illustrates an example of a number of QoE appearing times.

FIG. 31 illustrates an example of observed QoEs. It is estimated (or predicted) to be QoE=A1=6 at a clock time t1, QoE=A2=4 at a clock time t2, . . . . For example, when any of QoE=A6, A4, or A2 is estimated, a minimum point appears and the QoE observation is terminated.

When the minimum point at the timing of a clock time $T=QoE_{n-1}$, a minimum point following the minimum point at the timing of the clock time $T=QoE_n$, and the maximum point at the timing of the clock time $T=QoE_{n+1}$, the transition probability Qn and Pn may be expressed as Transition probability $Qn=[QoE_{n+1}-QoE_n]/[QoE_{n+1}-QoE_{n-1}]$, and Transition probability $Pn=[QoE_n-QoE_{n-1}]/[QoE_{n+1}-QoE_{n-1}]$. Here, Qn is the transition probability in a quality deterioration direction, and Pn is the transition probability in a quality improvement direction.

In the example of FIG. 31, in a case of terminating the observation at a clock time t6, Q6=5/6 and P6=1/6 and Qn becomes a value larger than Pn. In such a case, it is possible to reason that there is a high probability of poor QoE behaviors. In a case of terminating the observation at a clock time t5, Q5=4/5, P5=1/5 and it is possible to reason that there is a high probability of poor QoE behaviors in this case as well.

Figure 32:
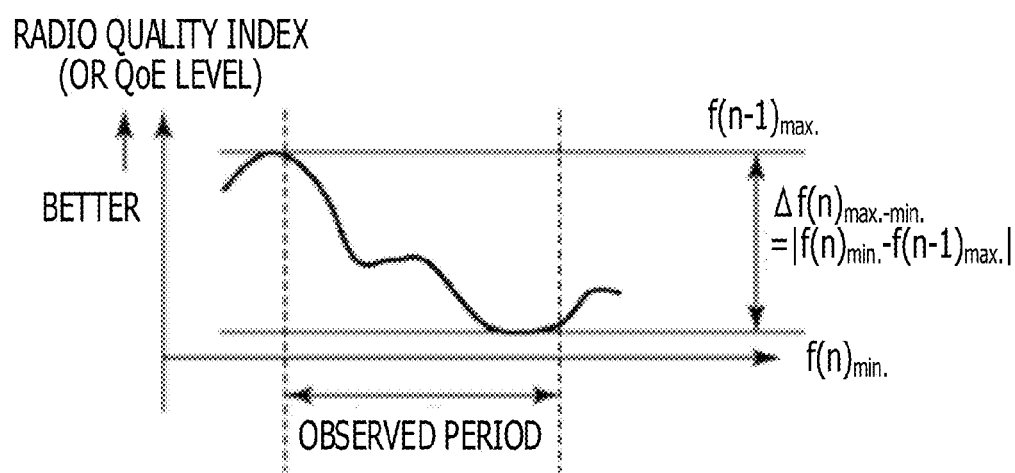
FIG. 32 illustrates an example of displacing a QoE relative to an observation section.

Here, there may also be a case that the range (or magnitude) of QoE variation influences the audio-visual quality experienced by the user. As illustrated in FIG. 32, when, for example, a quantile in the observation section $\Delta f(n)_{max.-min.}$ is at a threshold or more and the variation in the degradation direction is large, the influence to the audio-visual quality becomes large.

Figure 33A:
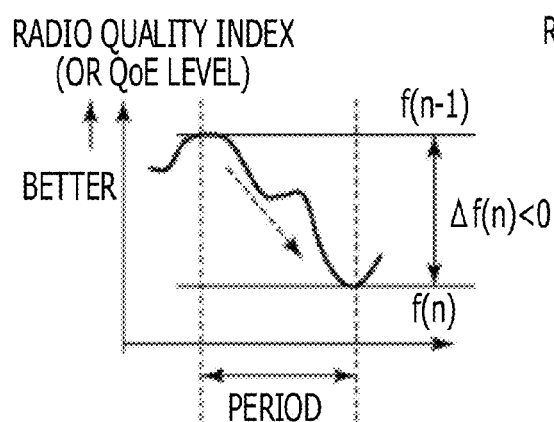
FIGS. 33A and 33B illustrate examples of changing audio-visual quality.
Figure 33B:
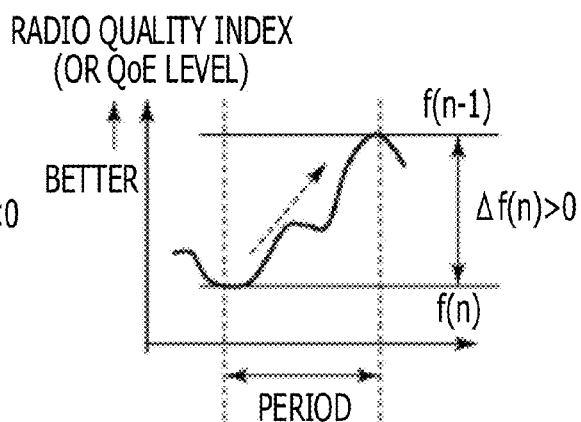

The example in FIG. 33A illustrates an example of the quantile $\Delta f(n)_{max.-min.}<0$ and in such a case, for example, the audio-visual quality is also deteriorated. In contrast, the example in FIG. 33B illustrates an example of the quantile $\Delta f(n)_{max.-min.}>0$ and, in this case, the audio-visual quality is improved.

Figure 34:
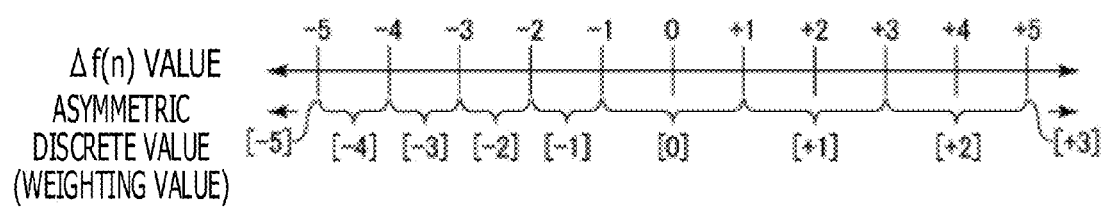
FIG. 34 illustrates an example of weighting relative to asymmetric discrete values.

FIG. 34 illustrates an example of carrying out weighting to a quantile Δf(n) with asymmetric discrete values. When the quantile Δf(n) may become a negative value, weighting to the quantile Δf(n) with asymmetric discrete values is carried out considering the human psychological factors (or asymmetric tracking model) of being influenced more strongly in the deteriorating direction.

In the meanwhile, it is also possible to judge the transition tendency by the QoE distribution. For example, the QoE distribution in unit time (T−n through T+n) may become normal distribution with a given quality standard value as a center.

Figure 35:
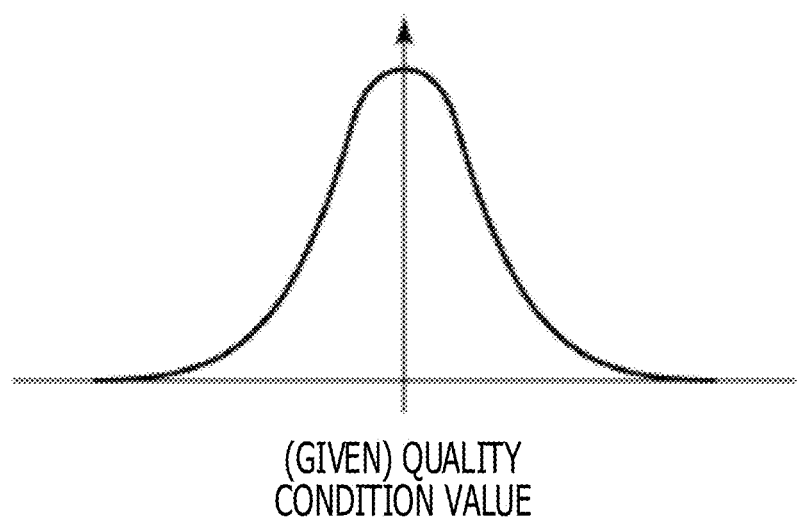
FIG. 35 illustrates an example of normal distribution of a QoE relative to a quality standard value.
Figure 36:
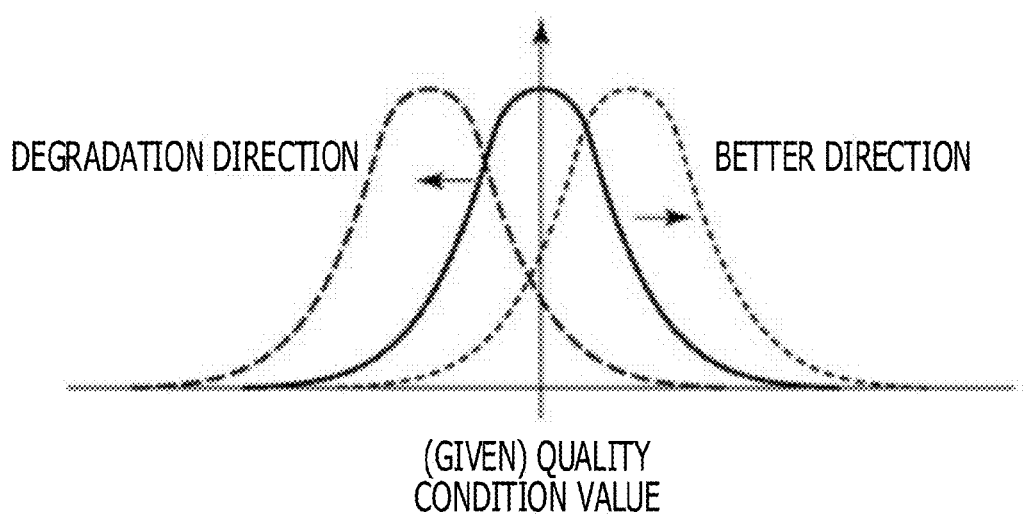
FIG. 36 illustrates another example of normal distribution of a QoE relative to a quality standard value.

FIG. 35 illustrates an example of such normal distribution. From this distribution condition, it is also possible to decide the QoE transition tendency. FIG. 36 illustrates a transition example of the QoE distribution condition. For example, the transition becomes a shift in the right direction in FIG. 36 when the QoE transits in the good direction, and the transition becomes a shift in the left direction in FIG. 36 when the QoE transits in the degraded direction. It is possible to judge the transition tendency from such normal distribution of QoE.

It is possible to calculate a degree of variation and a degree of bias for normal distribution, and it is also possible to decide the QoE transition tendency by the numerical values of the degree of variation and the degree of bias. The degree of variation $QoE_{STANDARD\ DEVIATION}$ is possible to be calculated by $$QoE_{STANDARD\ DEVIATION}=\sqrt{\{(QoE(0)-QoE_{AVE})^2+(QoE(1)-QoE_{AVE})^2+\ldots+(QoE(n)-QoE_{AVE})^2\}/n}.$$

The degree of bias $QoE_{DEVIATION}$ is possible to be calculated by, for example, $$QoE_{DEVIATION}=\{(QoE(b1)_{AVE}-QoEB_{STANDARD})^2+(QoE(b2)_{AVE}-QoEB_{STANDARD})^2+\ldots\}/QoEB_{STANDARD}.$$

The QoEB$_{AVE}$ denotes an average of normalized values QoE (n), and the QoEB$_{STANDARD}$ denotes a quality standard value, respectively.

For example, when the degree of bias QoE$_{DEVIATION}$ is more than "7.81", it is possible to judge that "a rare event has occurred" in the assumption that there is no bias in each block and the QoE may be regarded as biased.

From the above descriptions, the monitoring control device 300 is capable of understanding the QoE transition tendency from the QoE transition probability, the distribution condition, the degree of variation, the degree of bias of QoEs, and the like in a given observation section or data traffic receiving section.

Figure 37:
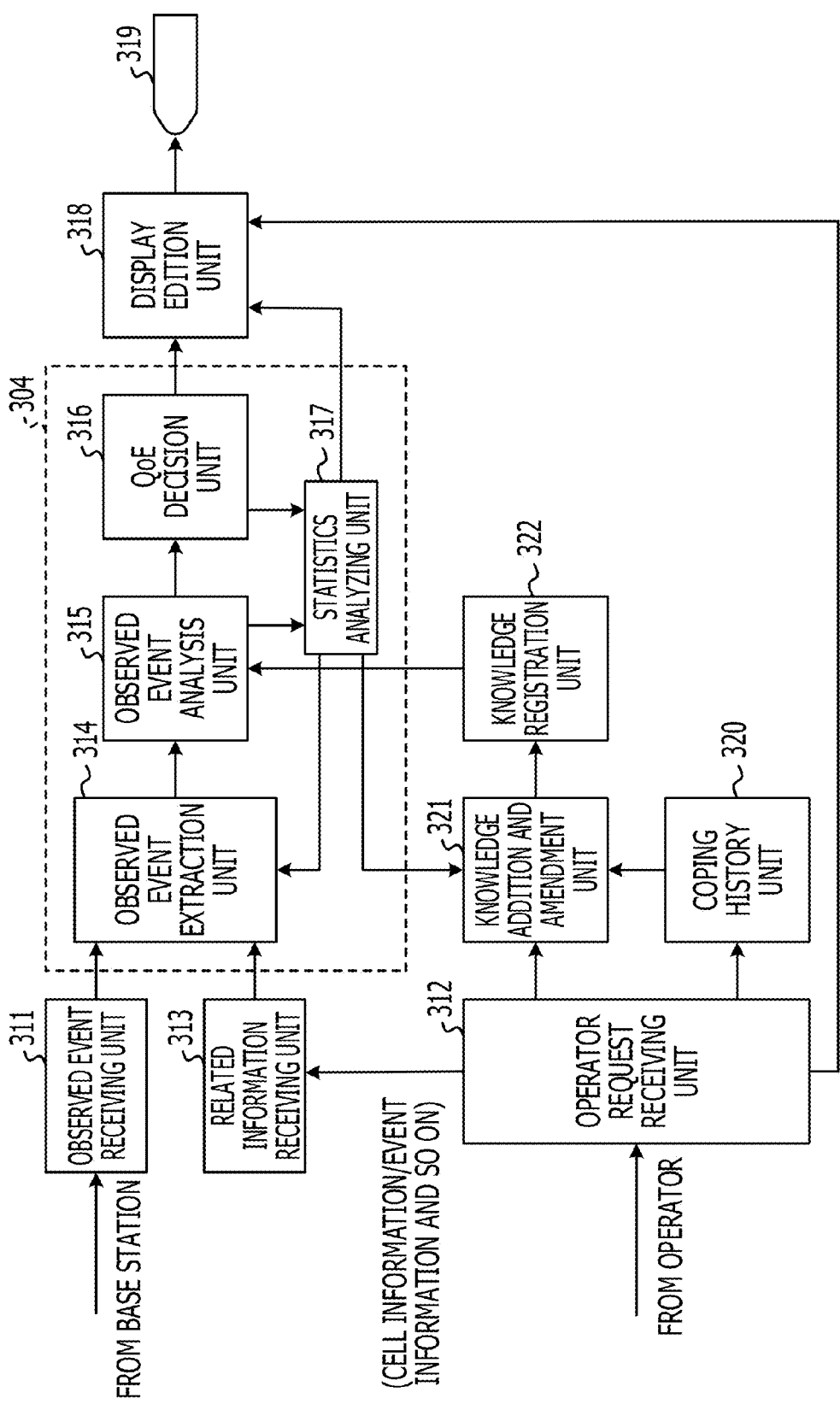
FIG. 37 illustrates a configuration example of a monitoring control device including a QoE calculation unit.

FIG. 37 illustrates a configuration example of the monitoring control device 300 in a case of carrying out the calculation described above and the like. The monitoring control device 300 is further provided with an observed event receiving unit 311, an operator request receiving unit 312, a related information receiving unit 313, an observed event extraction unit 314, an observed event analysis unit 315, a QoE decision unit 316, a statistics analyzing unit 317, a display edition unit 318, a monitor 319, a coping history unit 320, a knowledge addition and amendment unit 321, and a knowledge registration unit 322.

Here, the observed event extraction unit 314, the observed event analysis unit 315, the QoE decision unit 316, and the statistics analyzing unit 317 correspond to, for example, the QoE calculation unit 304.

The calculation of the transition probabilities Qn and Pn, the quantile Δf, the degree of variation QoE$_{STANDARD\ DEVIATION}$, the degree of bias QoE$_{DEVIATION}$, and the like is carried out by, for example, the statistics analyzing unit 317. The QoE quality decision by comparison with a threshold or the like is carried out by, for example, the QoE decision unit 316. The display edition unit 318 outputs the condition of QoE distribution, the QoE transition probabilities Qn and Pn, the quantile Δf, the degree of variation QoE$_{STANDARD\ DEVIATION}$, the degree of bias QoE$_{DEVIATION}$, and the like to the display unit 319, thereby displaying these graphs, values, and the like on the display unit 319. Such display enables to notify a system operator of, for example, the QoE transition tendency and the like in real time.

<4.9 Service Content Modification Process>

Next, descriptions are given to service content modification process. In the present mobile communication system 10, it is possible to modify a content in accordance with a predicted QoE when starting content delivery or during the delivery. Details are described as follows.

FIG. 38 illustrates correspondence between the type of content and the user experience quality (QoE). For example, when the content requested by a user is a content including a video and a sound and when the predicted QoE is "good", the monitoring control device 300 directly delivers the requested content.

In contrast, when the predicted QoE is "standard", the monitoring control device 300 does not deliver the requested content but delivers a content including subtitled video data. Further, when the predicted QoE is "degraded", the monitoring control device 300 makes a change to the content format or to the content components. For example, the monitoring control device 300 does not deliver the requested content but delivers content in a comic (or animation) format.

As illustrated in FIG. 38, it is also possible to modify an image size in accordance with the QoE. For example, the monitoring control device 300 delivers a content in the original size when the QoE is "good", delivers a content in a medium size when the QoE is "standard", and in a small size when "degraded".

Further, for example, in a case that a user requests delivery of a service content by a video phone, the monitoring control device 300 directly delivers a video phone when the QoE is "good", and is also capable of modifying to an email, an audio phone call, or the like when the QoE is "standard" or "degraded".

Alternatively, in a case that the user requests delivery of a service content by an online chat, the monitoring control device 300 directly carries out delivery of an online chat when the QoE is "good". In this case, the monitoring control device 300 makes a modification from an online chat to a social networking service (SNS) or an email when the QoE is "standard" or "degraded".

Figure 39:
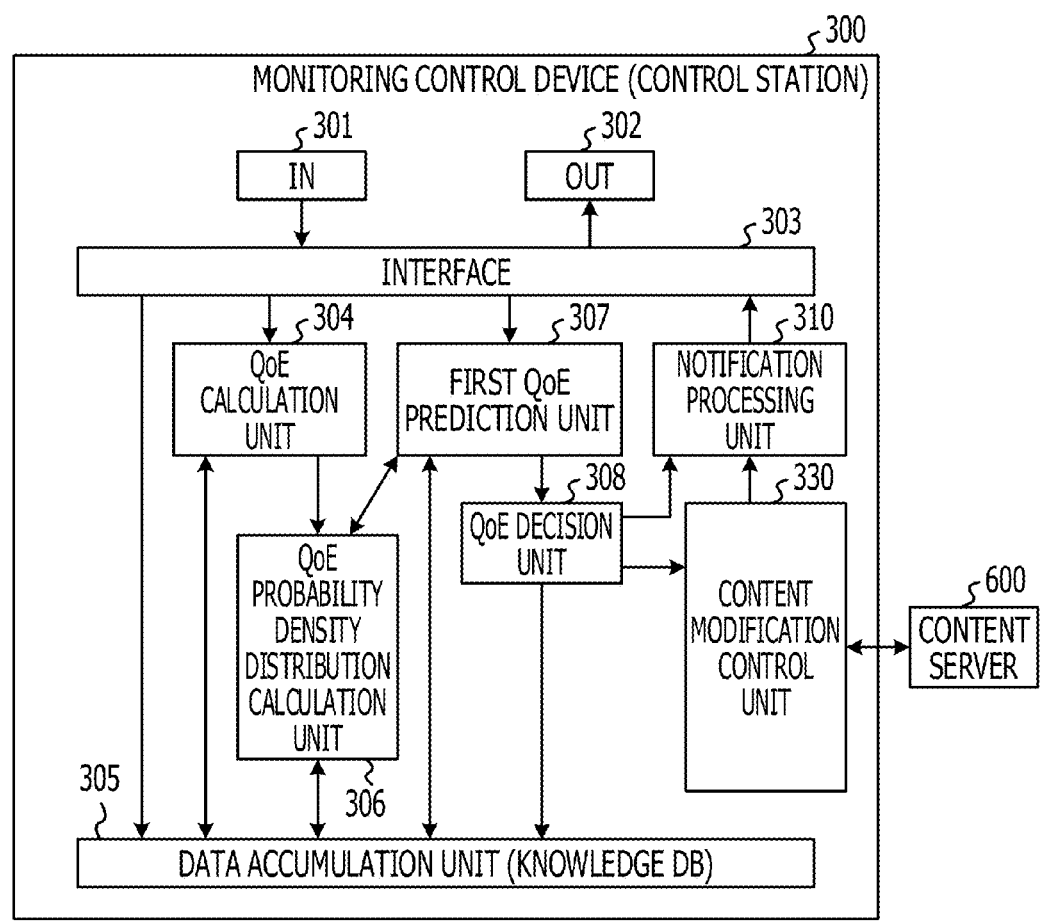
FIG. 39 illustrates another configuration example of a monitoring control device.

FIG. 39 illustrates a configuration example of the monitoring control device 300 in the present behavior example. The monitoring control device 300 is further provided with a content modification control unit 330.

The content modification control unit 330 receives a predicted QoE from, for example, the QoE decision unit 308, determines the type of content in accordance with the predicted QoE, and sends a message to direct delivery of the type of content thus determined to the content server 600. In this case, the content modification control unit 330 is provided with, for example, a table (for example, FIG. 38) illustrating the correspondence between QoE and a type of content and extracts the type of content in accordance with the predicted QoE from the QoE decision unit 308.

In a case of not makes a modification to the delivered or requested content in its type, the content modification control unit 330 is also capable of not sending a message to the content server 600.

Figure 40:
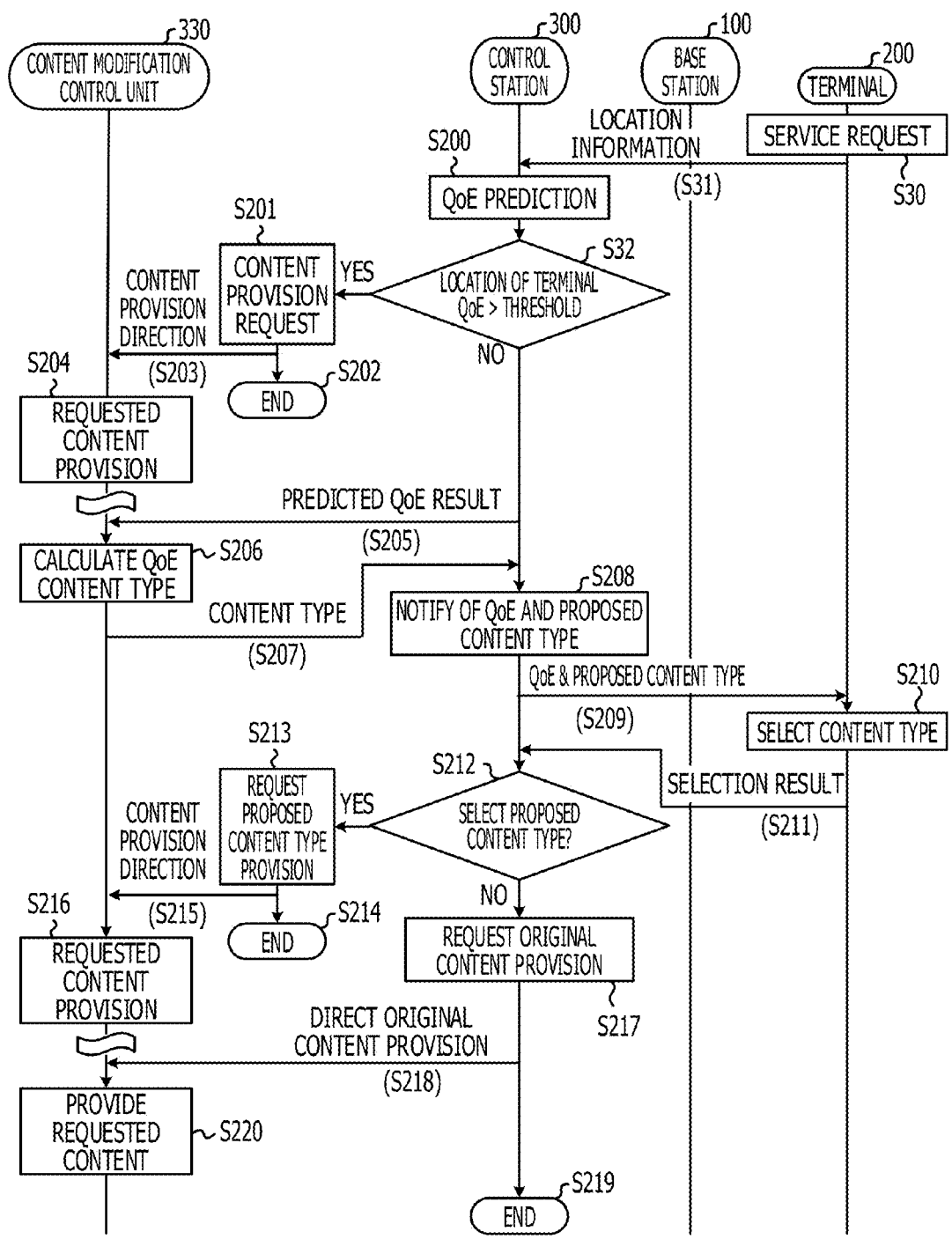
FIG. 40 is a sequence diagram illustrating yet another behavior example.

FIG. 40 illustrates a sequence example of service content modification process. An identical reference character is assigned to process identical to FIG. 11.

The monitoring control device 300 receives a content request message, and when the predicted QoE exceeds a threshold (yes in S32), directs to provide a content of the requested type (S203). For example, when the predicted QoE is at a threshold or more, the QoE decision unit 308 directs the content modification control unit 330 to provide a service content as the type of content included in the content request message.

As receiving the direction of content provision, the content modification control unit 330 sends a message to deliver a content of the requested type to the content server 600 (S204). Then, the monitoring control device 300 terminates the process (S202).

In contrast, when the predicted QoE is at the threshold or less (no in S32), the monitoring control device 300 notifies the content modification control unit 330 of the predicted QoE (S205). Then, the content modification control unit 330 calculates the type of content to deliver based on the predicted QoE (S206), and notifies the monitoring control device 300 of the type of content thus calculated (S207).

The monitoring control device 300 determines to notify the terminal 200 of the predicted QoE and the type of content thus calculated (S208), and sends the predicted QoE and the type of content thus calculated (or type of proposed content) to the terminal 200 (S209). For example, the content modification control unit 330 notifies the notification processing unit 310 of the type of proposed content, and the notification processing unit 310 generates a message including the predicted QoE and the type of proposed content and sends the message to the terminal 200.

As receiving the predicted QoE and the type of proposed content, the terminal 200 selects whether or not to select the type of proposed content (S210), and sends the selection result to the monitoring control device 300 (S211). For example, the control unit 240 of the terminal 200 displays the predicted QoE and the type of proposed content on the monitor screen, thereby prompting the user to select. The terminal 200 notifies of the selection result by, for example, sending a message indicating whether or not to have selected the proposed content and the like.

As receiving the selection result, the monitoring control device 300 decides whether or not to have selected the type of proposed content (S212), and when the proposed content is selected (yes in S212), notifies the content modification control unit 330 of the type of proposed content (S213 and S215). Then, the content modification control unit 330 sends a message indicating, for example, the type of proposed content to the content server 600, thereby delivering the service content in the type of proposed content (S216). After that, the monitoring control device 300 terminates the process (S214). Accordingly, in the content server 600, for example, other than the content including a video and a sound, a subtitled video content with no sound, a content in a comic format, identical contents in a variety of size, and the like are accumulated.

In contrast, when the type of proposed content is not selected (no in S212), the monitoring control device 300 directs the content modification control unit 330 to provide the type of content (S30 and S31) requested by the terminal 200 (S218). Then, the content modification control unit 330 controls to deliver the type of content requested by the terminal 200 over the content server 600. This allows delivering the type of content initially requested by the user although, for example, the QoE is not good. After that, the monitoring control device 300 terminates the process (S219).

Figure 41:
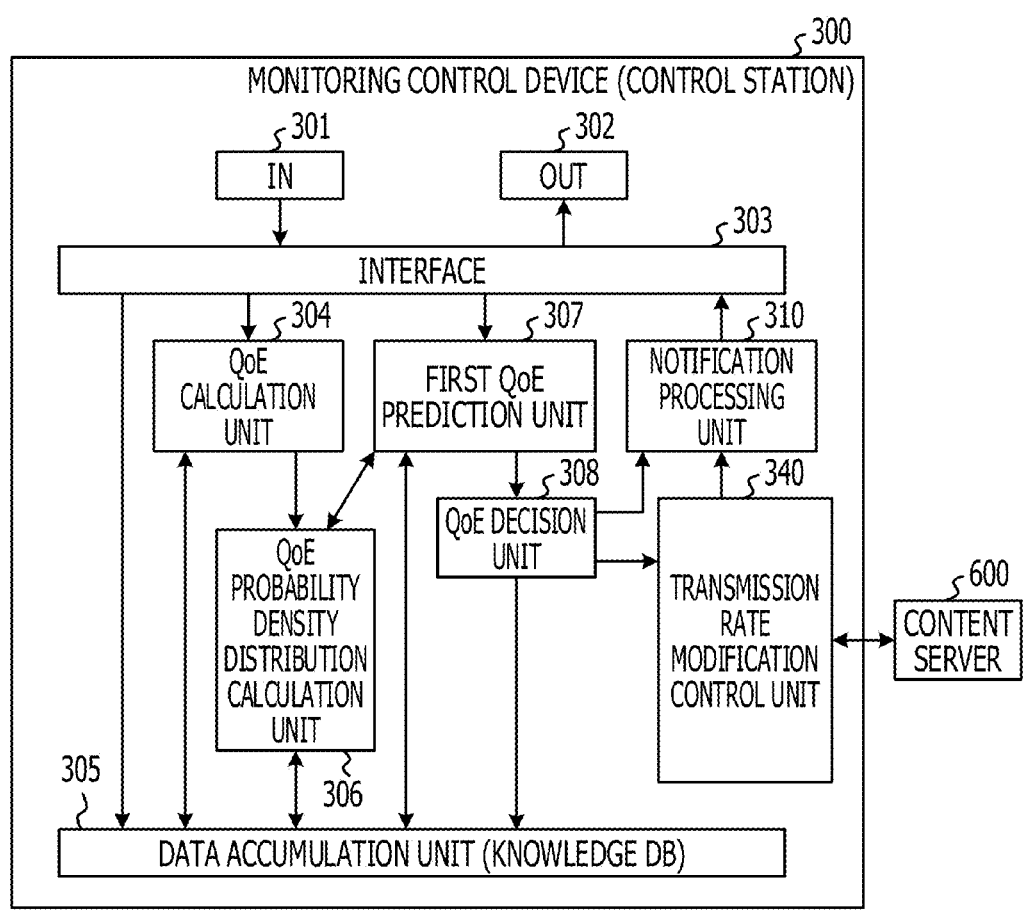
FIG. 41 illustrates still another configuration example of a monitoring control device.

Regarding the modification of a service content, it is also possible to modify, for example, the transmission rate in accordance with the QoE. FIG. 41 illustrates a configuration example of the monitoring control device 300 in a case of modifying the transmission rate, and FIG. 42 illustrates correspondence between the QoE and the transmission rate.

The monitoring control device 300 is further provided with a transmission rate modification control unit 340. The transmission rate modification control unit 340 obtains the transmission rate corresponding to the predicted QoE from the QoE decision unit 308, for example, from a table (for example, FIG. 42) and controls the content server 600 to deliver a service content at the transmission rate after the modification.

For example, there are transmission rates of "2 Mbps", "800 kbps", "100 kbps", and the like and a respective transmission rate is selected in accordance with "good", "standard", and "degraded" QoE.

In the present sequence example, the content modification control unit 330 is altered to the transmission rate modification control unit 340 and the type of content is altered to the type of transmission rate, thereby enabling to carry out process identical to the example of modifying the type of content (for example, FIG. 40).

In such a case of modifying the type of content as well, the terminal 200 receives delivery of the type of content in accordance with the QoE, so that it is possible to remove frustration and to provide delivery of a content without a delay. When the QoE is "degraded", there may also be a case of carrying out delivery at a lower transmission rate compared with the case of "good", so that the transmission load in the network is dispersed and it is also possible to keep from congestion in the network.

In the example described above, the process when starting the content delivery is described as illustrated in, for example, FIG. 40. For example, it is possible to modify the type of content even during content delivery. For example, when receiving provision of a service content, the terminal 200 appropriately sends a message including the location information to the monitoring control device 300, thereby allowing the monitoring control device 300 to appropriately notify the terminal 200 of the type of proposed content selected at that time. Accordingly, in the present mobile communication system 10, it is possible to modify the type of content not only when starting content delivery but also during the content delivery.

<4.10 Control Example>

Figure 43:
FIG. 43 illustrates a control example.

FIG. 43 illustrates an example of how a service content is delivered. This example illustrates an example that a user utilizing the terminal 200 travels from the "metropolitan area" through the "urban area" to the "sub-urban area" utilizing a train.

In such example, in the "metropolitan area", the traffic is high compared with the other areas and the QoS is not good compared with the other areas. Therefore, even when receiving content service provision in such area, the user is frustrated due to a response delay and the like. However, in the present mobile communication system 10, upon user's agreement to be frustrated, a service content is also possible to be provided even in the "metropolitan area".

In the present mobile communication system 10, a place (for example, "sub-urban area") or a clock time where QoE becomes good is notified to the terminal 200 lying in the "metropolitan area", and as the train travels to the place (or it reaches the clock time), a service content is delivered.

Other Embodiments

Next, other embodiments are described. In the second embodiment, the descriptions are given to an example of arranging the monitoring control device 300 in the mobile communication system 10 as a device separate from the base station 100. For example, the monitoring control device 300 (or functions of the monitoring control device 300) may also be equipped in the base station 100.

Figure 44:
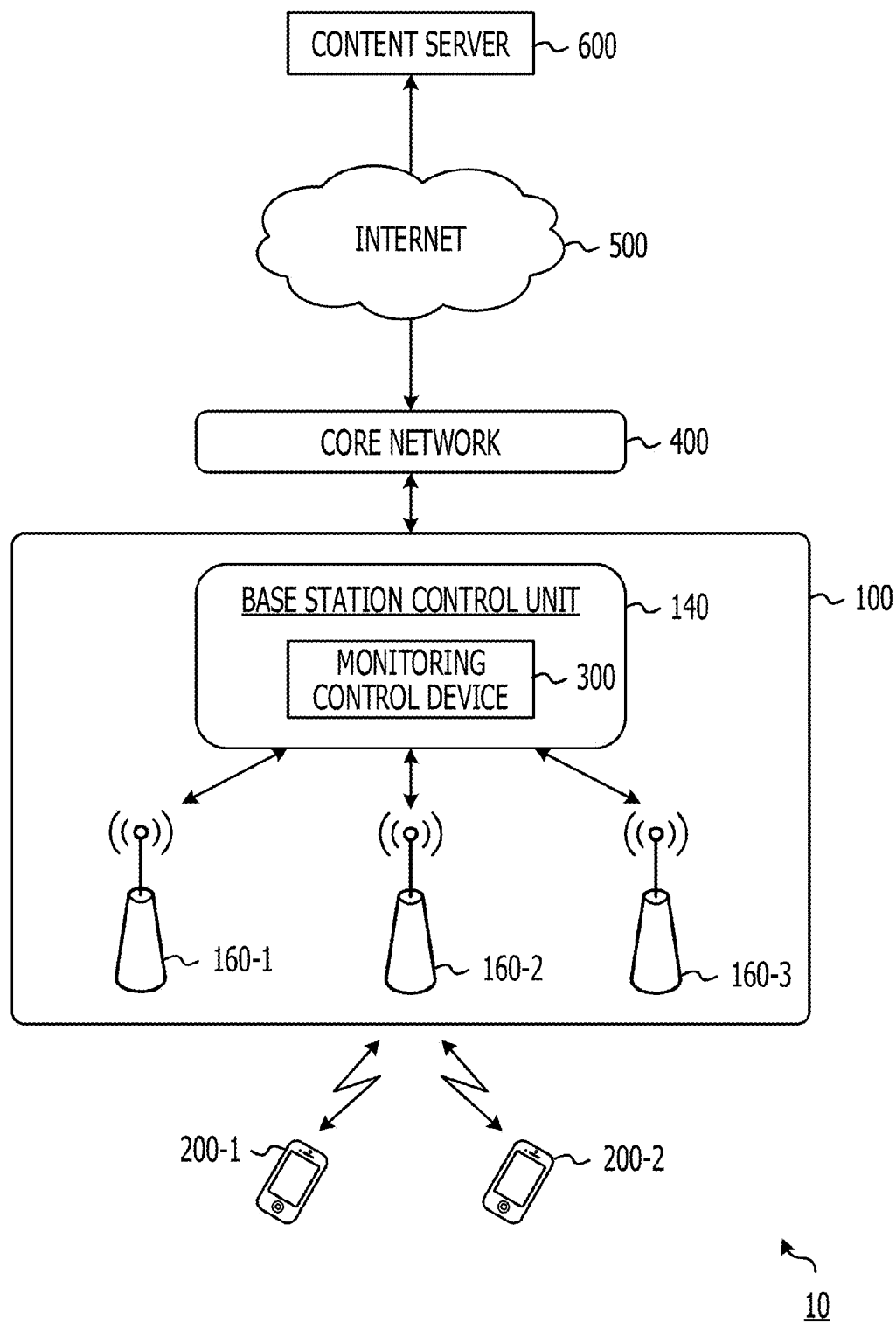
FIG. 44 illustrates still another configuration example of a mobile communication system.
Figure 45:
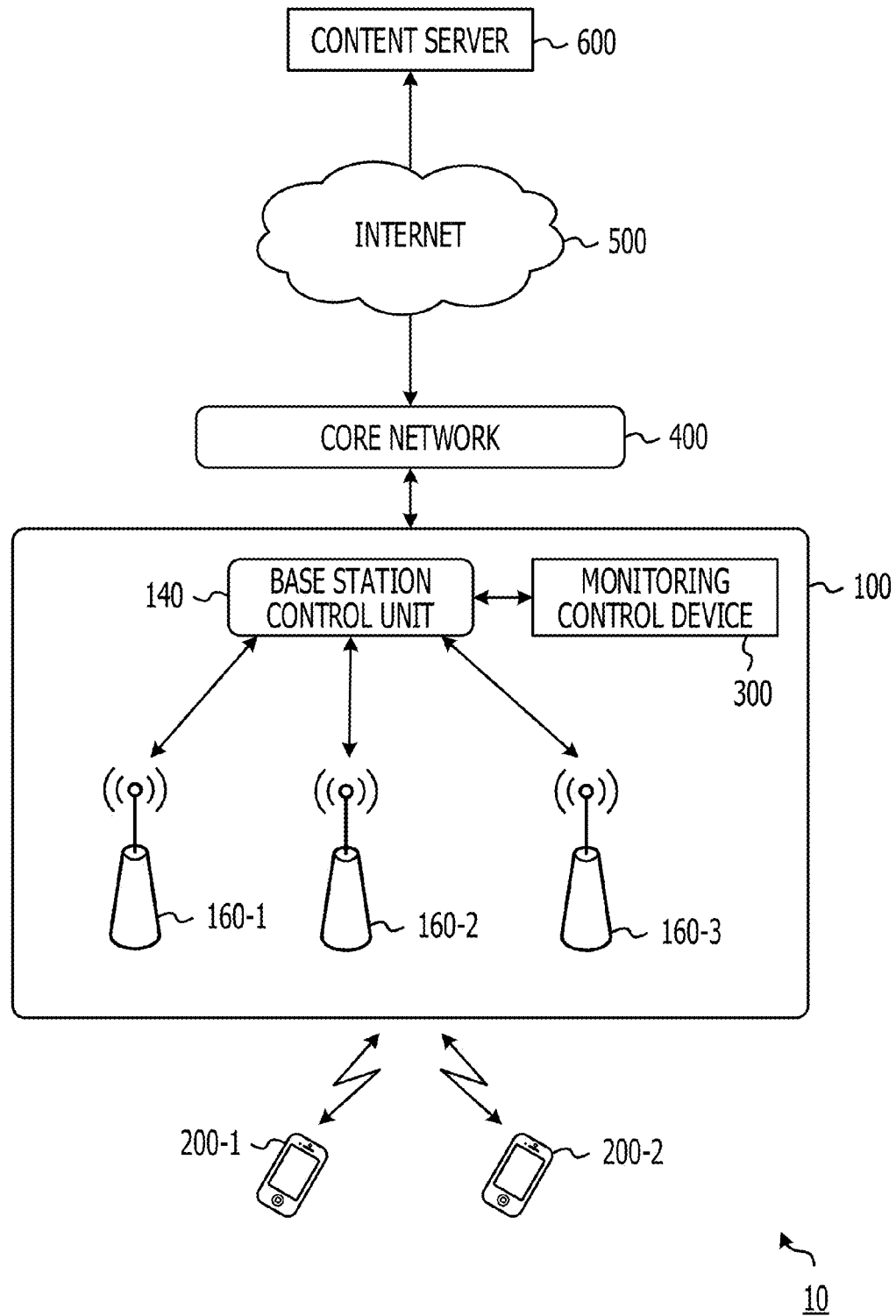
FIG. 45 illustrates yet another configuration example of a mobile communication system.

FIGS. 44 and 45 illustrate configuration examples of the mobile communication system 10 in such cases. FIG. 44 is an example of including the monitoring control device 300 in the control unit 140 of the base station 100. For example, the functions as the CPU 350 in the monitoring control device 300 are included in the control unit 140. In the meanwhile, FIG. 45 illustrates an example of externally attaching the monitoring control device 300 to the control unit 140 of the base station 100.

In either example, the base station 100 is provided with a plurality of radio units (remote radio units: RRU) 160-1 through 160-3 and one control unit (base band unit: BBU) 140, and the one control unit 140 is capable of concentrate controlling over the plurality of radio units 160-1 through 160-3 (centralized BBU: C-BBU).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile communication system comprising:
 a content server configured to store a content;
 a wireless base station device configured to receive the content sent from the content server;
 a mobile entity configured to wirelessly send mobile entity information;
 a terminal device configured to:
  receive the content wirelessly sent from the wireless base station device,
  receive the mobile entity information from the mobile entity when travelling together with the mobile entity, and
  wirelessly send the mobile entity information; and
 a monitoring control device configured to:
  control delivery of the content to the terminal device from the content server via the wireless base station device,
  receive the mobile entity information from the terminal device,
  calculate, based on location information of the mobile entity or the terminal device included in the mobile entity information sent from the terminal device, service area information of the mobile entity, and destination information of the mobile entity, each place where the terminal device passes through,
  calculate, based on mode information of the mobile entity included in the mobile entity information, each clock time when the terminal device reaches each calculated place to pass through,
  identify, based on each calculated place and each calculated clock time, a place where a quality of experience (QoE) for a user utilizing the terminal device due to delivery of the content, the QoE being predicted in accordance with sending of a first delivery request for the content from the terminal device, meets a given condition, and
  send information on the identified place to the terminal device.

2. The mobile communication system according to claim 1, wherein the monitoring control device is configured to:
 send to the terminal device via the wireless base station device, when the QoE does not meet the given condition, the information on a clock time or a place in which a new predicted QoE meets the given condition.

3. The mobile communication system according to claim 2, wherein the monitoring control device is configured to calculate a QoE based on a delay time after a second delivery request for the content sent from the terminal device is received until delivery of the content for the second delivery request is carried out to the terminal device and a traffic volume of the second delivery request.

4. The mobile communication system according to claim 3, wherein the monitoring control device is configured to calculate the QoE for a given time interval including a receiving clock time of a second delivery request, in an area where the terminal device that sends the second delivery request lies.

5. The mobile communication system according to claim 4, wherein the monitoring control device is configured to calculate the QoE in the given time interval in the area, using a QoE value which is calculated with the most number of times for each of the given time interval in the area.

6. The mobile communication system according to claim 3, wherein the monitoring control device is configured to extract a QoE as the predicted QoE from the calculated QoE, based on location information included in the first delivery request and a receiving clock time of the first delivery request.

7. The mobile communication system according to claim 2, wherein the monitoring control device is configured to control the content server, when the terminal device agrees with receiving delivery of the content in the clock time or place, so that the terminal device receives the delivery of the content in the clock time or place.

8. The mobile communication system according to claim 2, further comprising:
 a mobile entity configured to have a sensor to wirelessly send mobile entity information, wherein
 the terminal device is configured to receive the mobile entity information from the sensor when travelling together with the mobile entity, and
 the monitoring control device is configured to
  calculate, based on first location information included in the mobile entity information sent from the terminal device and second location information sent from the terminal device, a place where the new predicted QoE meets the given condition, and
  send the calculated place to the terminal device.

9. The mobile communication system according to claim 8, wherein the monitoring control device is configured to:
 calculate, based on the first and second location information, a place where the terminal device passes through,
 calculate, based on mode information of the mobile entity included in the mobile entity information, a clock time when the terminal device reaches the place to pass through,
 calculates, based on the calculated place and clock time, a place where the new predicted QoE meets the given condition, and
 send the calculated place to the terminal device.

10. The mobile communication system according to claim 3, wherein the monitoring control device is configured to calculate, when a number of the calculated QoE is a threshold or less, another calculated QoE based on attribute of an area where the terminal device lies.

11. The mobile communication system according to claim 10, further comprising:
 a memory configured to hold map information, wherein
 the monitoring control device is configured to calculate the attribute of the area corresponding to location information included in the second delivery request based on attribute for a respective area stored together with the map information.

12. The mobile communication system according to claim 11, wherein the monitoring control device is configured to calculate the another QoE based on the attribute of the area and whether a station is included in the area.

13. The mobile communication system according to claim 1, wherein the monitoring control device is configured to deliver a content of a type different from a type of content requested by the first delivery request from the content server, when the predicted QoE does not meet the given condition.

14. The mobile communication system according to claim 13, wherein the monitoring control device is configured to deliver a content at a transmission rate lower than a transmission rate of the content requested by the first delivery request, when the predicted QoE does not meet the given condition.

15. The mobile communication system according to claim 14, wherein the monitoring control device is configured to perform at least one of modifying a video phone to an email or an audio phone call, and modifying an online chat to a social networking service or an email, when the predicted QoE does not meet the given condition.

16. A monitoring control device comprising:
a memory;
a processor coupled to the memory and configured to:
    control delivery of a content to a terminal device from a content server via a wireless base station device,
    receive mobile entity information from the terminal device receiving the mobile entity information from a mobile entity when the terminal device travelling together with the mobile entity that wirelessly sends the mobile entity information,
    calculate, based on location information of the mobile entity or the terminal device included in the mobile entity information sent from the terminal device, service area information of the mobile entity, and destination information of the mobile entity, each place where the terminal device passes through,
    calculate, based on mode information of the mobile entity included in the mobile entity information, each clock time when the terminal device reaches each calculated place to pass through,
    identify, based on each calculated place and each calculated clock time, a place where a quality of experience (QoE) for a user utilizing the terminal device due to delivery of the content, the QoE being predicted in accordance with sending of a first delivery request for the content from the terminal device, meets a given condition, and
    send information on the identified place to the terminal device.

17. A monitoring control device comprising:
a memory;
a processor coupled to the memory and configured to:
    control delivery of a content to a terminal device from a content server via a wireless base station device,
    receive mobile entity information from the terminal device receiving the mobile entity information from a mobile entity when the terminal device travelling together with the mobile entity that wirelessly sends the mobile entity information,
    calculate, based on first location information and second location information included in the mobile entity information sent from the terminal device, each place where the terminal device passes through,
    calculate, based on mode information of the mobile entity included in the mobile entity information, each clock time when the terminal device reaches each calculated place to pass through,
    identify, based on each calculated place and each calculated clock time, a place where a quality of experience (QoE) for a user utilizing the terminal device due to delivery of the content, the QoE being predicted in accordance with sending of a first delivery request for the content from the terminal device, meets a given condition, and
    send information on the identified place to the terminal device.

* * * * *